US012676939B2

(12) United States Patent
Kudekar et al.

(10) Patent No.: US 12,676,939 B2
(45) Date of Patent: Jul. 7, 2026

(54) MACHINE LEARNING BASED SYSTEM AND METHOD FOR CONTROLLING RESIDUAL ARTIFACTS IN MEDIA CONTENTS TO OPTIMIZE USER EXPERIENCE IN REAL-TIME SCREEN-TO-CAMERA COMMUNICATION ENVIRONMENT

(71) Applicant: Shrinivas Kudekar, Roswell, GA (US)

(72) Inventors: Shrinivas Kudekar, Roswell, GA (US); Ashwin Ashok, Johns Creek, GA (US); Abbaas Alif-Mohamed Nishar, Atlanta, GA (US)

(73) Assignee: Shrinivas Kudekar, Roswell, GA (US)

( * ) Notice: Subject to any disclaimer, the term of this patent is extended or adjusted under 35 U.S.C. 154(b) by 216 days.

(21) Appl. No.: 18/780,539

(22) Filed: Jul. 23, 2024

(65) Prior Publication Data

US 2025/0030811 A1 Jan. 23, 2025

Related U.S. Application Data

(60) Provisional application No. 63/614,779, filed on Dec. 26, 2023, provisional application No. 63/515,108, filed on Jul. 23, 2023.

(51) Int. Cl.
*H04N 1/60* (2006.01)
*G06T 7/11* (2017.01)
(Continued)

(52) U.S. Cl.
CPC ............. *H04N 1/6008* (2013.01); *G06T 7/11* (2017.01); *H04N 19/176* (2014.11); *H04N 19/184* (2014.11); *G06T 2207/10024* (2013.01)

(58) Field of Classification Search
CPC .. H04N 1/6008; H04N 19/176; H04N 19/194; G06T 7/11; G06T 2207/10024
See application file for complete search history.

(56) References Cited

U.S. PATENT DOCUMENTS 8,229,159 B2 * 7/2012 Tourapis .............. H04N 19/162
382/100
10,785,495 B1 * 9/2020 Enigma .................. H04N 19/46
(Continued)

FOREIGN PATENT DOCUMENTS

WO WO-2015167580 A1 * 11/2015 ........... H04N 23/745

*Primary Examiner* — John W Miller
(74) *Attorney, Agent, or Firm* — Jason C. Cameron

(57) ABSTRACT

A machine learning based system and method for controlling residual artifacts in media contents to optimize user experience in real-time screen-to-camera communication environment, is disclosed. The machine learning based method includes converting RGB values of pixels to values of orthogonal or perceptual color space values for pixels; segmenting intensities of frames associated with the media contents, into bright, dark, and middle regions; generating symbols comprising optimized-frequency regions using a machine learning model; setting width border of boundaries to pre-determined pixel values for encoding ACR data; dividing the boundaries into boxes to embed information associated with symbols; assigning a bit value of one to boxes comprising first pre-determined sizes, and a bit value of zero to the boxes comprising second pre-determined sizes; assembling boxes within interior of frames; and controlling the residual artifacts of an encoding process in the media contents by reducing modulation depth based on the optimized redundancy.

20 Claims, 11 Drawing Sheets

(51) Int. Cl.
H04N 19/176 (2014.01)
H04N 19/184 (2014.01)

(56) References Cited

U.S. PATENT DOCUMENTS

2023/0109762 A1 * 4/2023 Suyama ................ G06T 1/0057
375/240.08
2024/0022752 A1 * 1/2024 Kudekar ............. H04N 19/136

* cited by examiner

100

900

902

1920px

1080px

1000

CONVERT ONE OR MORE RGB VALUES OF ONE OR MORE PIXELS ASSOCIATED WITH ONE OR MORE FRAMES OF THE ONE OR MORE MEDIA CONTENTS TO ONE OR MORE VALUES OF ONE OR MORE ORTHOGONAL COLOR SPACE VALUES FOR THE ONE OR MORE PIXELS ASSOCIATED WITH THE ONE OR MORE FRAMES OF THE ONE OR MORE MEDIA CONTENTS — 1002

SEGMENT ONE OR MORE INTENSITIES OF THE ONE OR MORE FRAMES ASSOCIATED WITH THE ONE OR MORE MEDIA CONTENTS, INTO AT LEAST ONE OF: BRIGHT REGION, DARK REGION, AND MIDDLE REGION — 1004

GENERATE ONE OR MORE SYMBOLS COMPRISING ONE OR MORE OPTIMIZED-FREQUENCY REGIONS BEING DETECTABLE AND CLASSIFIABLE USING A MACHINE LEARNING MODEL — 1006

SET A WIDTH BORDER OF ONE OR MORE BOUNDARIES TO PRE-DETERMINED PIXEL VALUES ALONG FOUR SIDES OF THE ONE OR MORE FRAMES FOR ENCODING ONE OR MORE DATA ASSOCIATED WITH AUTOMATIC CONTENT RECOGNITION — 1008

DIVIDE THE ONE OR MORE BOUNDARIES INTO ONE OR MORE BOXES COMPRISING ONE OR MORE PRE-DETERMINED SIZES, TO EMBED ONE OR MORE INFORMATION ASSOCIATED WITH THE ONE OR MORE SYMBOLS — 1010

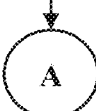

MACHINE LEARNING BASED SYSTEM AND METHOD FOR CONTROLLING RESIDUAL ARTIFACTS IN MEDIA CONTENTS TO OPTIMIZE USER EXPERIENCE IN REAL-TIME SCREEN-TO-CAMERA COMMUNICATION ENVIRONMENT

CROSS REFERENCE TO RELATED APPLICATION(S)

This application claims the priority to incorporates by reference the entire disclosure of U.S. provisional patent applications bearing No. 63/515,108, filed on Jul. 23, 2023 and "63/614,779" filed on Dec. 26, 2023 titled "Methods for invisible content modifications and machine learning based decoding to enable screen-to-camera interaction" and "Methods for content modifications and for upsampling videos to enable invisible and flicker-free screen-to-camera interaction"

FIELD OF INVENTION

Embodiments of the present disclosure relate to screen-to-camera communication systems and more particularly relates to a machine learning based (ML-based) system and method for controlling residual artifacts in media contents to optimize user experience in real-time screen-to-camera communication environment.

BACKGROUND

In the realm of real-time screen-to-camera interactions and communications, developing methods and apparatus for embedding information in real-world displays including monitors, television screens, digital billboards, and the like is crucial. There is a need to enhance the real-time, interactive screen-to-camera communication because traditional media consumption is primarily passive, limiting viewer engagement and interaction.

Even though television remains a most popular device for watching online streaming content, the viewers traditionally engaged in a passive consumption of media. However, the landscape of content consumption is evolving rapidly. Imagine a scenario where the viewers interact with the content they are watching, accessing additional information about the products, places, and people featured in a program. This capability is particularly relevant given that almost all adults of United States (US) possess a smartphone, and nearly all the viewers search for the information related to the content they are watching. This shift indicates a growing demand for interactive and enriching viewing experiences, where the viewers instantly find relevant details, making the content more engaging and useful.

Classical steganography and digital watermarking are the field of hiding the information in the images and the other media by changing the original content as little as possible. Traditional techniques change the least-significant bits of the digital image and embed the information in an appropriate transform domain including Discrete Cosine Transform (DCT), Discrete Fourier Transform (DFT), Wavelets, and the like. For the natural images, transform domain techniques embed the information in mid frequencies to high frequencies since most of the content lies in a low frequency regime. Spread-spectrum-based techniques including Code Division Multiple Access (CDMA) may also be applied to spread the information over all the frequencies. There are techniques which render the signal itself as an explicit artistic pattern in a part of the image or the whole image. Nevertheless, the traditional methods are not suitable for the real-time screen-to-camera communications, especially for the application of providing the enriched information in the streaming videos. The main reason is that a screen-to-camera channel, especially in the scenario of transmitting the information via the streaming videos on the television is inherently noisy. A screen light is diffusive, and an amount of light captured by the smartphone is low. This causes the images to be of poor quality, especially in low ambient lighting. Since the hand-held device acting as a receiver is never perfectly aligned with the screen, the screen-to-camera channel also suffers from perspective distortion and motion blur.

The transform domain techniques do not perform well even with a few pixels of inaccuracy in the screen detection. The classical steganography methods and even modern deep neural network-based approaches embed the information in high frequencies since the image and the video have the content only in the low frequencies to the mid frequencies. Nevertheless, the screen-camera channel has a lot of low-pass filtering effects which may destroy any information being transmitted in the high frequencies. The embedding information in the low frequencies makes it visible and thus obstructs the viewing experience.

There are several works based on transmitting the information using a two dimensional (2D) optical Orthogonal Frequency-Division Multiplexing (OFDM). However, the 2D optical OFDM does not aim to make the transmission invisible. The modern deep neural networks are trained to hide and recover the information in the images and the videos. These works train the deep neural networks to both encode and decode hidden messages and use a simple 'Manchester coding' technique for encoding and the deep neural network trained to decode the hidden message. Although the deep neural network approaches hold a lot of promise still the deep neural network have some shortcomings when deploying in the real world. For example, the deep neural networks are trained on data collected by authors and using standard datasets including MIRFLICKR, MS-COCO, and the like. The datasets, although consisting of the natural images, form a small subset of all the images and the videos. The power of the deep neural networks is demonstrated when the training data is a good representation of the actual (or test) data. If the data is even slightly perturbed, the deep neural networks may fail to predict with accuracy.

Traditionally, the screen-camera communication is based on alternating light intensity and color. The main idea is to rapidly flicker the intensity and the color of the pixels on the screen and across frames to transmit the information so that it is averaged out by a human visual system and thus invisible. However, with a camera sampling at a high enough rate and a powerful decoder, the subtle flickering is detected, enabling the information transmission.

There are various technical problems with the traditional methods in the prior art. In the existing technology, the inherent noise in the screen-camera channel, including low light capture, perspective distortion, motion blur, and the like poses significant challenges for the traditional methods. The channel's tendency to filter out the high-frequency information means that the traditional methods relying on the embedding data in these frequencies fail. Simple up-sampling techniques introduce the residual flickering, negatively affecting the visual quality of the content. Techniques that are not optimized for real-time applications introduce artifacts, detracting from the overall viewing experience.

Hence, there is a need for an improved machine learning based (ML-based) system and method for controlling residual artifacts in media contents to optimize user experience in real-time screen-to-camera communication environment, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine learning based method for controlling one or more residual artifacts in one or more media contents to optimize user experience in real-time screen-to-camera communication environment, is disclosed. The machine learning based method comprises converting, by one or more hardware processors, one or more RGB values of one or more pixels associated with one or more frames of the one or more media contents to one or more values of one or more orthogonal color space values or perceptual color space values for the one or more pixels associated with the one or more frames of the one or more media contents.

The machine learning based method further comprises segmenting, by the one or more hardware processors, one or more intensities of the one or more frames associated with the one or more media contents, into at least one of: bright region, dark region, and middle region. In an embodiment, each region of at least one of: the bright region, the dark region, and the middle region, is divided into one or more sub-regions to provide control on modifications to one or more pixel values.

The machine learning based method further comprises generating, by the one or more hardware processors, one or more symbols comprising one or more optimized-frequency regions being detectable and classifiable using a machine learning model. The machine learning based method further comprises setting, by the one or more hardware processors, a width border of one or more boundaries to pre-determined pixel values along four sides of the one or more frames for encoding one or more data associated with automatic content recognition. The machine learning based method further comprises dividing, by the one or more hardware processors, the one or more boundaries into one or more boxes comprising one or more pre-determined sizes, to embed one or more information associated with the one or more symbols.

The machine learning based method further comprises assigning, by the one or more hardware processors, a bit value of one to the one or more boxes comprising one or more first pre-determined sizes, and a bit value of zero to the one or more boxes comprising one or more second pre-determined sizes. The one or more pixels in the one or more boxes comprising the one or more first pre-determined sizes are flickered. The machine learning based method further comprises assembling, by the one or more hardware processors, one or more boxes comprising at least one of: the one or more first pre-determined sizes and the one or more second pre-determined sizes, within an interior of the one or more frames.

The machine learning based method further comprises generating, by the one or more hardware processors, one or more bits of the one or more information based on the one or more frames with one or more pre-determined sizes, with the one or more boxes comprising the one or more pre-determined sizes with a pre-determined number of the one or more pixels in the one or more boundaries. The machine learning based method further comprises optimizing, by the one or more hardware processors, redundancy based on a pre-determined number of bits of the one or more information. The machine learning based method further comprises controlling, by the one or more hardware processors, the one or more residual artifacts of an encoding process in the one or more media contents by reducing modulation depth based on the optimized redundancy.

In an embodiment, the machine learning based method further comprises (a) segmenting, by the one or more hardware processors, the one or more frames associated with the one or more media contents into the one or more boxes; (b) encoding, by the one or more hardware processors, each box of the one or more boxes in one or more second boxes with at least one of: the bit value of one indicating flickering of the one or more pixels and the bit value of zero indicating non-flickering of the one or more pixels; (c) generating, by the one or more hardware processors, one or more matrices of at least one of: the bit value of one and the bit value of zero, wherein a size of the one or more matrices is a size of the one or more boxes; and (d) encoding, by the one or more hardware processors, the one or more information of the one or more bits in the one or more boxes based on two-dimensional sequences with auto-correlation properties.

In another embodiment, the machine learning based method further comprises adjusting, by the one or more hardware processors, the one or more Red Green Blue (RGB) color values based on one or more values corresponding to each Red Green Blue color.

In yet another embodiment, the machine learning based method further comprises encoding, by the one or more hardware processors, the one or more information in one or more spaces between one or more data symbols by placing the one or more data symbols at two or more relative positions.

In yet another embodiment, the machine learning based method further comprises (a) grouping, by the one or more hardware processors, at least two bits with a pre-defined number of symbols in one or more regions to obtain Reed-Solomon codes for error-correction of the one or more bits of the one or more information; and (b) detecting, by the one or more hardware processors, the one or more regions based on an image segmentation technique at a decoder using the machine learning model, wherein the machine learning model comprises a neural network model.

In yet another embodiment, the machine learning based method further comprises training, by the one or more hardware processors, the machine learning model for detecting at least one of: one or more screens associated with one or more display devices and the one or more regions in which the at least two bits with a pre-defined number of symbols are grouped, and decoding the one or more bits.

The training of the machine learning model comprises (a) obtaining, by the one or more hardware processors, one or more information associated with one or more symbols through which at least two bits are transmitted; (b) determining, by the one or more hardware processors, whether the one or more symbols are corresponding to the pre-defined number of symbols; (c) generating, by the one or more hardware processors, one or more confidence scores upon the determination of the one or more symbols being correspondent to the pre-defined number of symbols; and (d) determining, by the one or more hardware processors, one or more errors on the one or more bits of the one or more information when the generated one or more confidence scores are within a pre-determined threshold value.

In yet another embodiment, the machine learning based method further comprises encrypting, by the one or more hardware processors, one or more sequences of the one or more bits of the one or more information using one or more cryptographic private keys.

In yet another embodiment, the machine learning based method further comprises up-sampling, by the one or more hardware processors, the one or more media content to modify the one or more media content during transmission of the one or more information. The modified one or more media content are invisible to one or more users. Up-sampling of the one or more media content comprises (a) converting, by the one or more hardware processors, one or more frame rates to a pre-defined frame rate using a sample-and-hold technique; (b) generating, by the one or more hardware processors, a first list of frames upon performing sample-and-hold up-sampling process for the one or more media content at the pre-defined frame rate; (c) generating, by the one or more hardware processors, a second list of frames; and (d) regenerating, by the one or more hardware processors, the one or more frames of the one or more media content to be rendered at the pre-defined frame rate by computing the linear combination of at least two contents in the second list of frames, to attain the modified one or more media content being invisible to the one or more users and to control flickering.

In an embodiment, generating the second list of frames by: (i) setting, by the one or more hardware processors, an index (j) in the first list of frames, which is excluding of at least one of: first position and last position, wherein if the index in the first list of frames is hold the first position, the first list of frames is placed at the first position, and wherein if the index in the first list of frames is hold the last position, the first list of frames is placed at the last position; (ii) modifying, by the one or more hardware processors, at least one of: the second list of frames and a third list of frames by: (a) computing, by the one or more hardware processors, a linear combination of at least two elements of each frame in at least one of: the second list of frames and the third list of frames to determine an average value for the linear combination of at least two elements; (b) maintaining, by the one or more hardware processors, at least two elements of each frame in at least one of: the second list of frames and the third list of frames, unchanged if the average value for a corresponding computed linear combination of at least two elements is a non-integer value; (c) incrementing, by the one or more hardware processors, the average value of at least two elements by adding with a variable counter value if the average value for the corresponding computed linear combination of at least two elements is an integer value, wherein the variable counter value is set to one; (d) dropping, by the one or more hardware processors, at least two elements of each frame in at least one of: the second list of frames and the third list of frames, if a value of addition of the average value with the variable counter value is odd; and (e) frame in at least one of: the second list of frames and the third list of frames, if a value of addition of the average value with the variable counter value is even.

In one aspect, a machine learning based system for controlling one or more residual artifacts in the one or more media contents to optimize user experience in real-time screen-to-camera communication environment, is disclosed. The machine learning based system includes one or more hardware processors and a memory. The memory is coupled to the one or more hardware processors. The memory comprises a plurality of subsystems in form of programmable instructions executable by the one or more hardware processors. The plurality of subsystems comprises a color space values conversion subsystem configured to convert one or more RGB values of one or more pixels associated with one or more frames of the one or more media contents to one or more values of one or more orthogonal color space values or perceptual color space values for the one or more pixels associated with the one or more frames of the one or more media contents.

The plurality of subsystems further comprises an intensity segmenting subsystem configured to segment one or more intensities of the one or more frames associated with the one or more media contents, into at least one of: bright region, dark region, and middle region. Each region of at least one of: the bright region, the dark region, and the middle region, is divided into one or more sub-regions to provide control on modifications to one or more pixel values.

The plurality of subsystems further comprises a symbol generation subsystem configured to generate one or more symbols comprising one or more optimized-frequency regions being detectable and classifiable using a machine learning model. The plurality of subsystems further comprises a border setting subsystem configured to set a width border of one or more boundaries to pre-determined pixel values along four sides of the one or more frames for encoding one or more data associated with automatic content recognition. The plurality of subsystems further comprises a boundaries dividing subsystem configured to divide the one or more boundaries into one or more boxes comprising one or more pre-determined sizes, to embed one or more information associated with the one or more symbols.

The plurality of subsystems further comprises a value assigning subsystem configured to assign a bit value of one to the one or more boxes comprising one or more first pre-determined sizes, and a bit value of zero to the one or more boxes comprising one or more second pre-determined sizes. The one or more pixels in the one or more boxes comprising the one or more first pre-determined sizes are flickered. The plurality of subsystems further comprises a box assembling subsystem configured to assemble one or more boxes comprising at least one of: the one or more first pre-determined sizes and the one or more second pre-determined sizes, within an interior of the one or more frames.

The plurality of subsystems further comprises a bit generation subsystem configured to generate one or more bits of the one or more information based on the one or more frames with one or more pre-determined sizes, with the one or more boxes comprising the one or more pre-determined sizes with a pre-determined number of the one or more pixels in the one or more boundaries.

The plurality of subsystems further comprises a redundancy optimizing subsystem configured to optimize redundancy based on the pre-determined number of bits of the one or more information. The plurality of subsystems further comprises a residual artifact controlling subsystem configured to control the one or more residual artifacts of an encoding process in the one or more media contents by reducing modulation depth based on the optimized redundancy.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
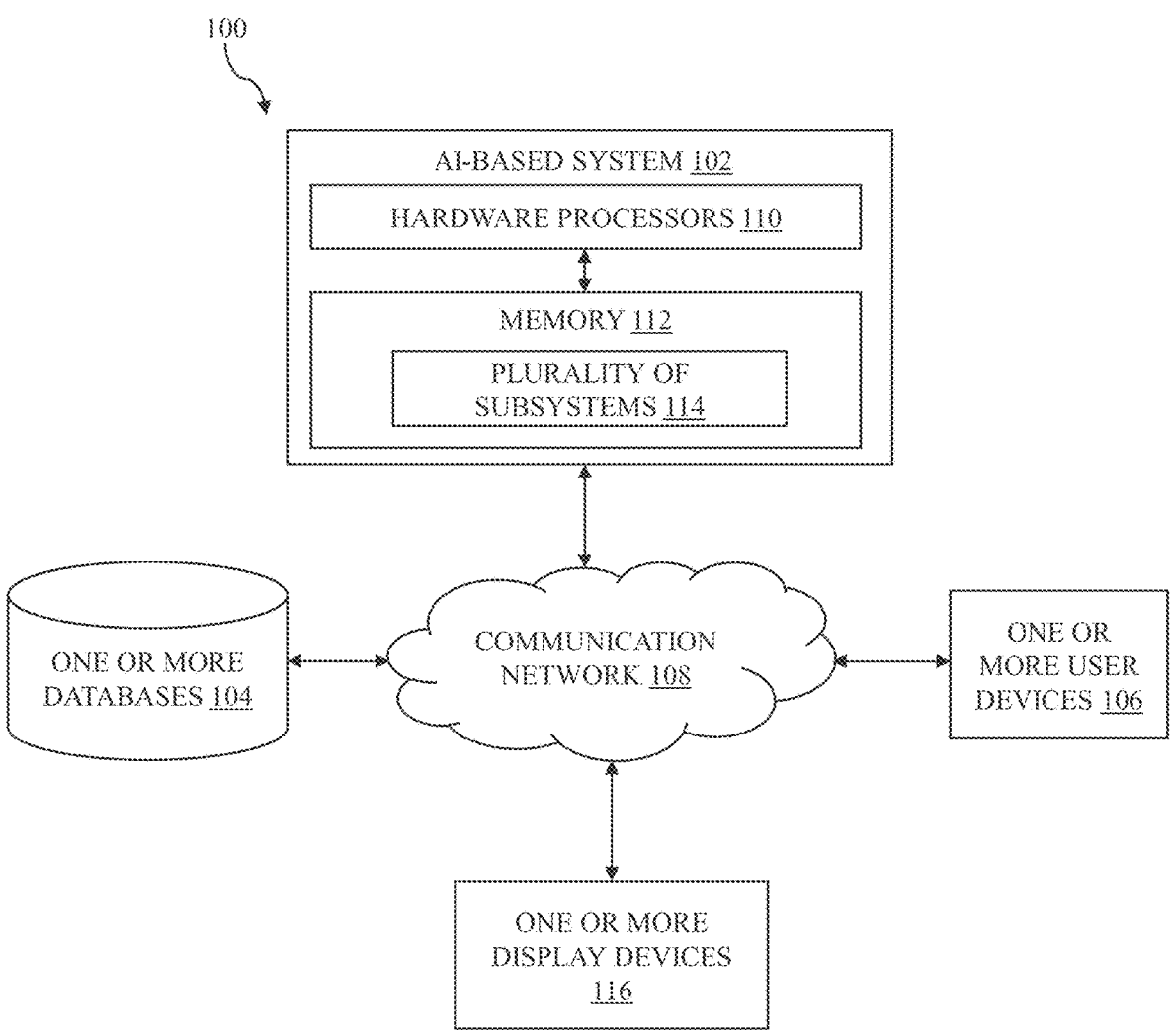
FIG. 1 is a block diagram illustrating a computing environment with a machine learning based system for controlling one or more residual artifacts in one or more media contents to optimize user experience in real-time screen-to-camera communication environment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

In the present invention, a machine learning based (ML-based) system is configured to reduce flickering in one or more media content by up-sampling of the one or more media content. The machine learning based (ML-based) system is further configured to utilize adaptive modulation of one or more pixels in one or more frames to control/reduce encoding residual artifacts in the one or more media content.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based system 102 for controlling one or more residual artifacts in one or more media contents to optimize user experience in real-time screen-to-camera communication environment, in accordance with an embodiment of the present disclosure.

According to FIG. 1, the network architecture 100 may include the machine learning based system 102, one or more databases 104, one or more user devices 106, and one or more display devices 116. The machine learning based system 102 may be communicatively coupled to the one or more databases 104, and the one or more user devices 106 via a communication network 108. The communication network 108 may be a wired communication network and/or a wireless communication network. The one or more databases 104 may include, but is not limited to, media content, media information, product catalogs, product information, offers information, promotional information, any other content, and combinations thereof.

Further, the one or more user devices 106 and the one or more display devices 116 may be associated with, but not limited to, a user, a viewer, an individual, an administrator, a vendor, a technician, a worker, a supervisor, a team, an entity, an organization, a facility, and the like. The entity and the facility may include, but is not limited to, a hospital, an e-commerce company, a merchant organization, an airline company, a hotel booking company, a company, an outlet, a manufacturing unit, an enterprise, an organization, an educational institution, a secured facility, a warehouse facility, a supply chain facility, any other facility, and the like.

The one or more user devices 106 may be used to provide input and/or receive output to/from the machine learning based system 102. The one or more user devices 106 may present to the user one or more user interfaces for the user to interact with the machine learning based system 102 for the encoded information managing needs. The one or more user devices 106 may be at least one of, an electrical, an electronic, an electromechanical, and a computing device. The one or more user devices 106 may include, but is not limited to, a mobile device, a smartphone, a Personal Digital Assistant (PDA), a tablet computer, a phablet computer, a wearable computing device, a Virtual Reality/Augmented Reality (VR/AR) device, a laptop, a desktop, a server, and the like. Further, the one or more display devices 116 may include, but is not limited to, a monitor, a television, a projector, a digital billboard, a digital signage, a smartphone, a tablet, a phablet, any other display device, and the like.

Further, the machine learning based system 102 may be implemented by way of a single device or a combination of multiple devices that may be operatively connected or networked together. The machine learning based system 102 may be implemented in hardware or a suitable combination of hardware and software. The machine learning based system 102 includes a hardware processor(s) 110 and a memory 112.

The memory 112 may include a plurality of subsystems 114. The machine learning based system 102 may be a hardware device including the one or more hardware processors 110 executing machine-readable program instructions for managing encoded information in a real-time screen-to-camera communication environment. Execution of the machine-readable program instructions by the one or more hardware processors 110 may enable the proposed machine learning based system 102 to manage encoded information in a real-time screen-to-camera communication environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory 112 operationally coupled with the machine learning based system 102 for performing tasks such as data processing, input/output processing, and/or any other functions. Any reference to a task in the present disclosure may refer to an operation being or that may be performed on data.

Although FIG. 1 illustrates the machine learning based system 102, the one or more user devices 106, and the one or more display devices 116 connected to the one or more databases 104, one skilled in the art can envision that the machine learning based system 102, the one or more user devices 106, and the one or more display devices 116 connected to the one or more databases 104 can be connected to several user devices, display devices located at different locations and several databases via the communication network 108.

Those of ordinary skilled in the art will appreciate that the hardware depicted in FIG. 1 may vary for particular implementations. For example, other peripheral devices such as an optical disk drive and the like, a local area network (LAN), a wide area network (WAN), a wireless (e.g., wireless-fidelity (Wi-Fi)) adapter, a graphics adapter, a disk controller, an input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

The machine learning based system 102 is initially configured to convert one or more Red Green Blue (RGB) values of one or more pixels associated with one or more frames of the one or more media contents to one or more values of one or more orthogonal color space values or perceptual color space values for the one or more pixels associated with the one or more frames of the one or more media contents. The machine learning based system 102 is further configured to segment one or more intensities of the one or more frames associated with the one or more media contents, into at least one of: bright region, dark region, and middle region. In an embodiment, each region of at least one of: the bright region, the dark region, and the middle region, is divided into one or more sub-regions to provide control on modifications to one or more pixel values.

The machine learning based system 102 is further configured to generate one or more symbols comprising one or more optimized-frequency regions being detectable and classifiable using a machine learning model. The machine learning based system 102 is further configured to set a width border to pre-determined pixel values at one or more boundaries along four sides of the one or more frames for encoding one or more data associated with automatic content recognition. The machine learning based system 102 is further configured to divide the one or more boundaries into one or more boxes comprising one or more pre-determined sizes, to embed one or more information associated with the one or more symbols.

The machine learning based system 102 is further configured to assign a bit value of one to the one or more boxes comprising one or more first pre-determined sizes, and a bit value of zero to the one or more boxes comprising one or more second pre-determined sizes. In an embodiment, the one or more pixels in the one or more boxes comprising the one or more first pre-determined sizes are flickered.

The machine learning based system 102 is further configured to assemble one or more boxes comprising at least one of: the one or more first pre-determined sizes and the one or more second pre-determined sizes, within an interior of the one or more frames. The machine learning based system 102 is further configured to generate one or more bits of the one or more information based on the one or more frames with one or more pre-determined sizes, with the one or more boxes comprising the one or more pre-determined sizes with a pre-determined number of the one or more pixels in the one or more boundaries. The machine learning based system 102 is further configured to optimize redundancy based on the pre-determined number of bits of the one or more information. The machine learning based system 102 is further configured to control the one or more residual artifacts of an encoding process in the one or more media contents by reducing modulation depth based on the optimized redundancy.

The machine learning based system 102 may be hosted on a central server including at least one of: a cloud server or a remote server. In an embodiment, the machine learning based system 102 may include at least one of: a user device, a server computer, a server computer over the communication network 108, a cloud-based computing system, a cloud-based computing system over the communication network 108, a distributed computing system, and the like. Further, the communication network 108 may be at least one of: a Wireless-Fidelity (Wi-Fi) connection, a hotspot connection, a Bluetooth connection, a local area network (LAN), a wide area network (WAN), any other wireless network, and the like.

Further, the computing environment 100 includes the one or more databases 104 communicatively coupled to the machine learning based system 102 through the communication network 108. In an embodiment, the one or more databases 104 include at least one of: one or more relational databases, one or more object-oriented databases, one or more data warehouses, one or more cloud-based databases, and the like. In another embodiment, a format of the one or more data retrieved from the one or more databases 104 may include at least one of: a comma-separated values (CSV) format, a JavaScript Object Notation (JSON) format, an Extensible Markup Language (XML), spreadsheets, and the like.

In an embodiment of the present disclosure, the machine learning based system 102 includes the plurality of subsystems 114. Details on the plurality of subsystems 114 have been elaborated in subsequent paragraphs of the present description with reference to FIG. 2.

Figure 2:
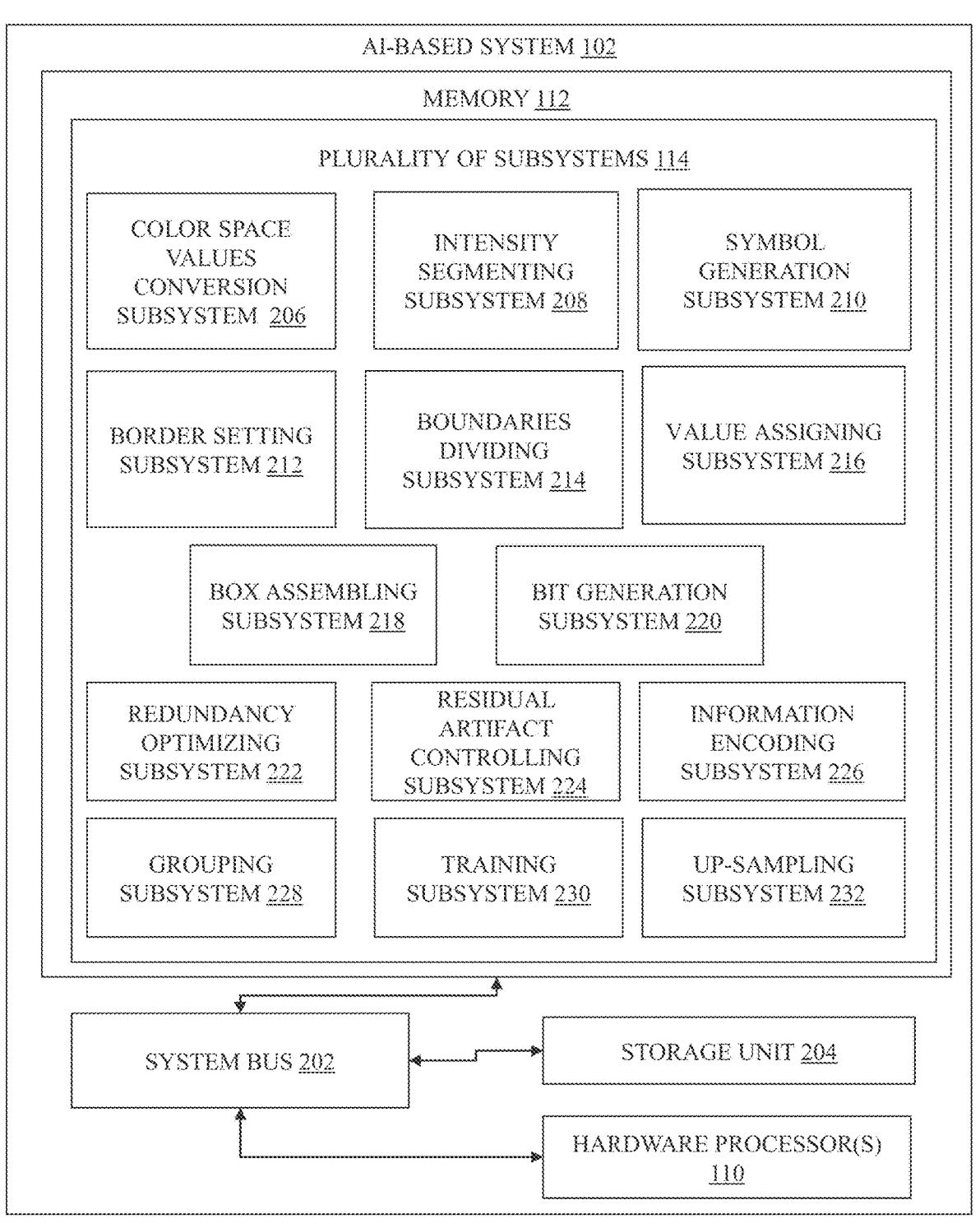
FIG. 2 illustrates an exemplary block diagram representation of the machine learning based system, such as those shown in FIG. 1, capable of controlling the one or more residual artifacts in the one or more media contents to optimize the user experience in the real-time screen-to-camera communication environment, in accordance with an embodiment of the present disclosure.

FIG. 2 illustrates an exemplary block diagram representation of the machine learning based system 102, such as those shown in FIG. 1, capable of controlling the one or more residual artifacts in the one or more media contents to optimize the user experience in the real-time screen-to-camera communication environment, in accordance with an embodiment of the present disclosure.

The machine learning based system 102 includes the one or more hardware processors 110, the memory 112, and a storage unit 204. The one or more hardware processors 110, the memory 112, and the storage unit 204 are communicatively coupled through a system bus 202 or any similar mechanism. The memory 112 includes the plurality of subsystems 114 in the form of programmable instructions executable by the one or more hardware processors 110.

The plurality of subsystems 114 includes a color space values conversion subsystem 206, an intensity segmenting subsystem 208, a symbol generation subsystem 210, a border setting subsystem 212, a boundaries dividing subsystem 214, a value assigning subsystem 216, an information transmission subsystem 218, a box assembling subsystem 218, a bit generation subsystem 220, a redundancy optimizing subsystem 222, a residual artifact controlling subsystem 224, an information encoding subsystem 226, a grouping subsystem 228, a training subsystem 232, and an up-sampling subsystem 232.

The one or more hardware processors 110, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, including at least one of: generic or programmable logic devices or arrays, application specific integrated circuits, single-chip computers, and the like.

The memory 112 may be non-transitory volatile memory and non-volatile memory. The memory 112 may be coupled for communication with the one or more hardware processors 110, being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 112 includes the plurality of subsystems 114 stored in the form of machine-readable instructions on any of the above-mentioned storage media and may be in communication with and executed by the one or more hardware processors 110.

The storage unit 204 may be a cloud storage, a Structured Query Language (SQL) data store, a noSQL database or a location on a file system directly accessible by the plurality of subsystems 114.

The plurality of subsystems 114 includes the color space values conversion subsystem 206 that is communicatively connected to the one or more hardware processors 110. The color space values conversion subsystem 206 is configured to convert the one or more RGB values of the one or more pixels associated with the one or more frames of the one or more media contents to the one or more values of the one or more orthogonal color space values or the perceptual color space values for the one or more pixels associated with the one or more frames of the one or more media contents. For example, the color space values conversion subsystem 206 is configured to obtain a frame number F1 that includes a pixel with the one or more RGB values [r1,g1,b1] and the same pixel may include values [r2,g2,b2] in a consecutive frame F2. In an encoding process, the one or more RGB values [r1,g1,b1] are converted to one or more values of the one or more orthogonal color space values (e.g., OKLAB colorspace) or the perceptual color space values. The converted one or more OKLAB values may be [l1, a1, b1] for the frame F1 and [l2, a2, b2] for the frame F2.

In an embodiment, the color space values conversion subsystem 206 is configured to obtain values [r1',g1',b1'] from [l1,a1,b1] and [r2',g2',b2'] from [l2,a2,b2], when the values [(r1+r2)/2, (g1+g2)/2, (b1+b2)/2] are close to the values [(r1'+r2')/2, (g1'+g2')/2, (b1'+b2')/2]. The one or more pixels may be modified when differences of values for the components is smaller than 2 pixel values. In an embodiment, the differences of values for the components may be larger even though the converted values from the one or more RGB values to the one or more OKLAB colorspace values are one-to-one due to numerical precision values and integer (RGB) versus floating point (OKLAB) values.

The color space values conversion subsystem 206 is further configured to modulate only over one or more pixel regions in an interior of a color gamut. The color space values conversion subsystem 206 is further configured to identify the color gamut or the range of possible colors allowed by a particular display and to utilize the color gamut to perform the encoding process. If there is a pixel with the one or more RGB values close to the boundary of the range of allowed colors, then modulating around that color value may result in colors which may not be represented by the display.

The plurality of subsystems 114 includes the intensity segmenting subsystem 208 that is communicatively connected to the one or more hardware processors 110. The intensity segmenting subsystem 208 is configured to segment the one or more intensities of the one or more frames associated with the one or more media contents, into at least one of: the bright region, the dark region, and the middle region. In an embodiment, each region of at least one of: the bright region, the dark region, and the middle region, is divided into one or more sub-regions to provide control on modifications to one or more pixel values.

For example, in the bright region, the one or more pixels may have typically high intensity (i.e., 'L' values greater than 0.95). In this bright region, the one or more pixel values are modify in both 'L' channel and 'a' channel. But, in an opposite direction, to keep the overall intensity, the one or more pixel values may be same in both the 'L' channel and the 'a' channel. For example, if the 'L' value is changed by +d, then the 'a' value is changed by −d in frame #0. In the frame #1, the values are reversed by changing the 'L' value by −d, and the 'a' value by '+d', which is used to transmit the one or more information in the bright region of the one or more frames while maintaining the one or more residual artifacts to the minimum.

In the dark region, the one or more pixel values are modified in both the 'L' channel and the 'a' channel. Since, the one or more pixel values include lower intensity, the changes are made to the 'L' channel and the 'a' channel in the same direction to amplify effects of the channels, which is used to transmit the one or more information in the dark region of the one or more frames. In the middle region where the one or more pixel values are moderately intense, and the 'a' channel is only modified and hence no information is transmitted on the 'L' channel.

The plurality of subsystems 114 includes the symbol generation subsystem 210 that is communicatively connected to the one or more hardware processors 110. The symbol generation subsystem 210 is configured to generate the one or more symbols comprising the one or more optimized-frequency regions being detectable and classifiable using a machine learning model. For example, the symbol generation subsystem 210 is configured to gracefully change the one or more pixel values to closely indicate a desired shape rather than having sudden change in the one or more pixel values in the region of interest, along the boundary of the shape.

The plurality of subsystems 114 includes the border setting subsystem 212 that is communicatively connected to the one or more hardware processors 110. The border setting subsystem 212 is configured to set the width border to the pre-determined pixel values (e.g., 20 pixels) at one or more boundaries along four sides of the one or more frames for encoding one or more data associated with automatic content recognition. In an embodiment, within the one or more frames, any type of patterns may be used to denote a group of bits. For example, a square with vertical stripes may be bit '0' and a square with horizontal stripes may be bit '1'.

In an embodiment, the detection of one or more data associated with the automatic content recognition may be noiseless, and the one or more data associated with the automatic content recognition may include smaller values for modulation depth, which are used for the one or more pixels corresponding to the one or more boundaries than the one or more pixels corresponding to the interior. In an embodiment, the detection of automatic content recognition at the one or more boundaries may be used to detect the one or more data associated with the automatic content recognition and detection of the one or more frames to estimate one or more metadata embedded in the interior.

The plurality of subsystems 114 includes the boundaries dividing subsystem 214 that is communicatively connected to the one or more hardware processors 110. The boundaries dividing subsystem 214 is configured to divide the one or more boundaries into one or more boxes comprising one or more pre-determined sizes (e.g., 15*30 pixels), to embed one or more information associated with the one or more symbols.

The plurality of subsystems 114 includes the value assigning subsystem 216 that is communicatively connected to the one or more hardware processors 110. The value assigning subsystem 216 is configured to perform processes for encoding a bit value of 0 and a bit value of 1. Typically, for the bit value of 1, the one or more pixels are flickered in the one or more boxes using a temporal chromatic flickering. For the bit value of 0, the one or more pixels in the one or more boxes are not flickered. The value assigning subsystem 216 is configured to assign the bit value of 1 to the one or more boxes including one or more first pre-determined sizes (e.g., 15*30 pixels), and a bit value of 0 to the one or more boxes including one or more second pre-determined sizes (e.g., 15*15 pixels). This means that upon using energy accumulation decoding, the one or more boxes indicating the bit value of 1 with temporal chromatic flickering, may light up and the one or more boxes indicating the bit value of 0 may not light up. In an embodiment, with this encoding of the bit value of 0 and the bit value of 1, the screen detection and the data transmission may be performed (shown in FIG. 5).

The plurality of subsystems 114 includes the box assembling subsystem 218 that is communicatively connected to the one or more hardware processors 110. The box assembling subsystem 218 is configured to assemble/tile the one or more boxes comprising at least one of: the one or more first pre-determined sizes and the one or more second pre-determined sizes, within an interior of the one or more frames (shown in FIG. 8). For example, by interior, a rectangular area within a frame may be a fixed distance away from the one or more boundaries. In an embodiment, the one or more boundaries may be flickered for the purpose of detecting the one or more frames. The bit value of 0 may be indicated/represented by a box of the pixels which are not flickered and the bit value of 1 may be indicated by a box of the pixels which are flickered, or vice-versa.

In an embodiment, any regular shape at different sizes (i.e., number of pixels/cm$^2$) to map the one or more bits into the value of 1 or 0. The box assembling subsystem 218 is further configured to permute and combine one or more options for at least one of: symbol's shapes, size, orientation, along with a direction of chromatic and intensity flickering of a pixel region, for achieve higher order modulation (i.e., multiple bits per symbol). In an embodiment, achieving multiple bits per symbol may increase data rate in benign situations and may provide robustness and security in challenging and unsecure environments.

The plurality of subsystems 114 includes the bit generation subsystem 220 that is communicatively connected to the one or more hardware processors 110. The bit generation subsystem 220 is configured to generate the one or more bits of the one or more information based on the one or more frames with the one or more pre-determined sizes (e.g., 1920*1080), with the one or more boxes comprising the one or more pre-determined sizes (e.g., 15*30) with the pre-determined number of the one or more pixels (e.g., 60 pixels) in the one or more boundaries.

The plurality of subsystems 114 includes the redundancy optimizing subsystem 222 that is communicatively connected to the one or more hardware processors 110. The redundancy optimizing subsystem 222 is configured to optimize the redundancy based on the pre-determined number of bits (e.g., 40 bits of information to indicate a trillion indices) of the one or more information.

The plurality of subsystems 114 includes the residual artifact controlling subsystem 224 that is communicatively connected to the one or more hardware processors 110. The residual artifact controlling subsystem 224 is configured to control the one or more residual artifacts of the encoding process in the one or more media contents by reducing the modulation depth based on the optimized redundancy.

The plurality of subsystems 114 includes the information encoding subsystem 226 that is communicatively connected to the one or more hardware processors 110. The information encoding subsystem 226 is configured to transmit the one or more information bits per pixel. For transmission, the information encoding subsystem 226 is configured to segment the one or more frames associated with the one or more media contents into the one or more boxes. The information encoding subsystem 226 is further configured to encode each box of the one or more boxes in one or more second boxes (e.g., small boxes) with at least one of: the bit value of 1 indicating flickering of the one or more pixels and the bit value of 0 indicating non-flickering of the one or more pixels.

The information encoding subsystem 226 is further configured to generate one or more matrices of at least one of: the bit value of 1 and the bit value of 0. In an embodiment, a size of the one or more matrices is a size of the one or more boxes. The information encoding subsystem 226 is further configured to encode the one or more information of the one or more bits in the one or more boxes based on two-dimensional sequences with auto-correlation properties, for efficient demodulation/decoding of the one or more symbols.

In an embodiment, the information encoding subsystem 226 is further configured to encode the one or more information in one or more spaces between the one or more data symbols by placing the one or more data symbols at two or more relative positions. For example, a bit value of 0 may indicate/represent a space of distance 'd' between the one or more data symbols and a bit value of 1 may represent a space of distance 'f' between the one or more data symbols.

In an embodiment, the information encoding subsystem 226 is further configured to add subtle secret methods (not easily determined by an attacker) into the encoding/decoding processes. The information encoding subsystem 226 is configured to encode some bits based on the space between the symbols. The information encoding subsystem 226 is configured to allow one or more credible decoders (e.g., browsers or apps on devices) who have authenticated, may provide the additional information. The information encoding subsystem 226 is configured to make the positions based on a known polynomial sequence to identify additional subtle secret methods, which may be used to authenticate the one or more media contents with generative AI or deep fake media contents.

The plurality of subsystems 114 includes the grouping subsystem 228 that is communicatively connected to the one or more hardware processors 110. The grouping subsystem 228 is configured to group at least two bits with a pre-defined number of symbols (e.g., 4 symbols/shapes) in one or more regions to obtain Reed-Solomon codes for error-correction of the one or more bits of the one or more information. The grouping subsystem 228 is further configured to detect the one or more regions based on an image segmentation technique at a decoder using the machine learning model. In an embodiment, the machine learning model may include a Resnet architecture-based neural network model with depth 3 or more, to detect which regions are good for grouping the one or more symbols for optimized transmission of the one or more data. Since, a screen to camera channel is burst erasure in a localized area, the one or more bits representing a symbol should also be in a local area, which makes the error-correction more effective. For example, the grouping subsystem 228 sets 2 bits/symbol (e.g., 4 shapes including ellipses at 0 deg, 90 deg, 45 deg and 135 deg). In an embodiment, a Reed-Solomon (RS) code is used for more error-correction capability.

If the grouping subsystem 228 uses a RS code over field of 256 (GF($2^8$)), then 8 bits or 4 symbols/shapes may represent one RS alphabet. If the grouping subsystem 228 arranges 4 shapes in one row, then this arrangement is more susceptible to loss of a symbol/shape than the arrangement of the 4 shapes in 2 rows and 2 columns (like a square). For RS decoding, even if one symbol is erased, the entire RS alphabet of which it is a part of is erased. Hence, the grouping subsystem 228 is configured to group the symbols representing a RS alphabet tightly, such as a square or in a circle.

The grouping subsystem 228 is configured to incorporate the one or more bits in micro areas within macro regions that encompass the boxes/grid. The grouping subsystem 228 is configured to utilize the one or more pixel spaces being divided into one or more quadrants and to encode a same code. In an embodiment, each symbol within the micro region may be reused to encode multiple small pixels as 1s or 0s.

The plurality of subsystems 114 includes the up-sampling subsystem 232 that is communicatively connected to the one or more hardware processors 110. The up-sampling subsystem 232 is configured to convert a media content with one or more frame rates (e.g., 24, 25, and 30 FPS) to a media content with a pre-defined frame rate (e.g., 60 FPS) using a sample-and-hold technique. For example, if there are 10 frames, then the up-sampling subsystem 232 is configured to generate a first list of frames (e.g., [0,0,0,1, 1,2,2,2,3,3,4,4, 4,5,5,6,6,6,7,7,8,8,8,9,9]) upon performing sample-and-hold up-sampling process for the one or more media content at the pre-defined frame rate.

The up-sampling subsystem 232 is further configured to generate a second list of frames by setting an index (j) in the first list of frames, which is excluding of at least one of: first position and last position, and at that index, the list of frames are placed such as [list_of_frames[j−1], list_of_frames[j+ 1]]. In an embodiment, if the index in the first list of frames is hold the first position, the first list of frames ([[list_of_frames[0], list_of_frames[0]]]) is placed at the first position (0). In another embodiment, if the index in the first list of frames is hold the last position, the first list of frames [[list_of_frames[N], list_of_frames[N]]] is placed at the last position (N). For example, the up-sampling subsystem 232 is configured to obtain a third list of frames (e.g., temp_list_of_frames) as [[0, 0], [0, 0], [0, 1], [0, 1], [1, 2], [1, 2], [2, 2], [2, 3], [2, 3], [3, 4], [3, 4], [4, 4], [4, 5], [4, 5], [5, 6], [5, 6], [6, 6], [6, 7], [6, 7], [7, 8], [7, 8], [8, 8], [8, 9], [8, 9], [9, 9]].

For generating the second list of frames, the up-sampling subsystem 232 is configured to modify at least one of: the second list of frames and a third list of frames by computing a linear combination of at least two elements of each frame in at least one of: the second list of frames and the third list of frames to determine an average value for the linear combination of at least two elements. For example, the first frame is [0,0] and the average value is 0. The third frame [0,1] and the average value is 0.5. The up-sampling subsystem 232 is further configured to maintain at least two elements of each frame in at least one of: the second list of frames and the third list of frames, unchanged if the average value for a corresponding computed linear combination of at least two elements is a non-integer value.

The up-sampling subsystem 232 is further configured to increment the average value of at least two elements by adding with a variable counter value if the average value for the corresponding computed linear combination of at least two elements is an integer value. In an embodiment, the variable counter value is set to 1. The up-sampling subsystem 232 is further configured to drop at least two elements of each frame in at least one of: the second list of frames and the third list of frames, if a value of addition of the average value with the variable counter value is odd. The up-sampling subsystem 232 is further configured to duplicate at least two elements of each frame in at least one of: the second list of frames and the third list of frames, if a value of addition of the average value with the variable counter value is even.

For example, the up-sampling subsystem 232 is configured to: drop [0,0], duplicate [0,0], drop [2,2], duplicate [4,4], drop [6,6], duplicate [8,8] and drop [9,9], from the above said list of frames, which provides the second list of frames as [[0, 0], [0, 0], [0, 1], [0, 1], [1, 2], [1, 2], [2, 3], [2, 3], [3, 4], [3, 4], [4, 4], [4, 4], [4, 5], [4, 5], [5, 6], [5, 6], [6, 7], [6, 7], [7, 8], [7, 8], [8, 8], [8, 8], [8, 9], [8, 9]]. In order to obtain a same size as the original list, the up-sampling subsystem 232 is configured to duplicate the last frame to obtain the second list of frames [[0, 0], [0, 0], [0, 1], [0, 1], [1, 2], [1, 2], [2, 3], [2, 3], [3, 4], [3, 4], [4, 4], [4, 4], [4, 5], [4, 5], [5, 6], [5, 6], [6, 7], [6, 7], [7, 8], [7, 8], [8, 8], [8, 8], [8, 9], [8, 9], [8,9]].

The up-sampling subsystem 232 is further configured to regenerate the one or more frames of the one or more media content to be rendered at the pre-defined frame rate (e.g., 60 FPS) by computing the linear combination of at least two contents in the second list of frames, to attain the modified one or more media content being invisible to the one or more users and to control flickering. In this way, the up-sampling subsystem 232 is configured to repeat the frame twice and perform perfect cancellation leading to invisible changes and reduced flickering, when the media content includes 30 FPS.

The plurality of subsystems 114 includes the training subsystem 230 that is communicatively connected to the one or more hardware processors 110. The training subsystem 230 is configured to utilize a machine learning model for decoding the embedded information in a screen content. In an embodiment, a machine learning model for the decoding process may be processed for both raw image frame feed from the media content (i.e., a video content played on the one or more display devices 116), and on camera captured footage of the screen content. The training subsystem 230 is configured to utilize the machine learning model (i.e., a neural-network based deep learning (DL) as a baseline for developing key decoding strategies. The machine learning model is retrained for detecting the screen and its borders, detecting the encoded geometric regions, and decoding the one or more bits using classification mechanisms.

The machine learning model may be used for decoding strategy and achieving the target fidelity. The machine learning model at the decoder may be is specific to the encoding process and thus not possible to replicate without access to an actual encoding algorithm and associated data. Thus, the machine learning model at the decoder may be configured to scale naturally with encoding pipeline as the encoder and decoders may need to work in harmony based on mutual agreement of the processes.

The training subsystem 230 is configured to train the machine learning model for detecting at least one of: one or more screens associated with one or more display devices and the one or more regions in which the at least two bits with a pre-defined number of symbols are grouped, and decoding the one or more bits. For training the machine learning model, the training subsystem 230 is configured to obtain one or more information associated with one or more symbols through which at least two bits are transmitted. The training subsystem 230 is further configured to determine whether the one or more symbols are corresponding to the pre-defined number of symbols (e.g., 4 shapes/symbols). The training subsystem 230 is further configured to generate one or more confidence scores upon the determination of the one or more symbols being correspondent to the pre-defined number of symbols. The training subsystem 230 is further configured to determine one or more errors on the one or more bits of the one or more information when the generated one or more confidence scores are within a pre-determined threshold value. In an embodiment, the machine learning model (e.g., 4-class neural network model) may be easy to train and require no manual labelling of data.

The plurality of subsystems 114 includes a device setting subsystem (not shown in FIG. 2) that is communicatively connected to the one or more hardware processors 110. The device setting subsystem is configured to provide an indication to the one or more users to disable a "motion smoothing" option in a setting of the one or more display devices 116 through an application of the machine learning based system 102.

The plurality of subsystems 114 includes a filmmaker activation subsystem (not shown in FIG. 2) that is communicatively connected to the one or more hardware processors 110. The filmmaker activation subsystem is configured to activate "filmmaker" mode in the metadata of the one or more media content including hidden information encoded with chromatic flicker fusion techniques to reduce the one or more encoded residual artifacts.

The plurality of subsystems 114 includes a correlation decoder subsystem (not shown in FIG. 2) that is communicatively connected to the one or more hardware processors 110. A received media content at the one or more user devices 106 may include one or more encoded bits in forms of geometric shapes (i.e., the one or more symbols along with noise and other artifacts created by a channel) based on a use case of the machine learning based system 102. The correlation decoder subsystem is configured to estimate a position of each symbol based on overlaying an original grid pattern (used at the encoder) and to run a patch-based image correlation with a template for different lags along X (horizontal) and Y (vertical) on the 2D plane of the received image. The correlation decoder subsystem is configured to create the template for each of the modulated bits or symbols and at different patch resolution and quality (noise, ex. blur, partial or full erasures).

Figure 3:
FIG. 3 illustrates an exemplary schematic representation of one or more users associated with one or more user devices capturing a video of the one or more media content being displayed on one or more display devices including a television, in accordance with an embodiment of the present disclosure.
Figure 3:
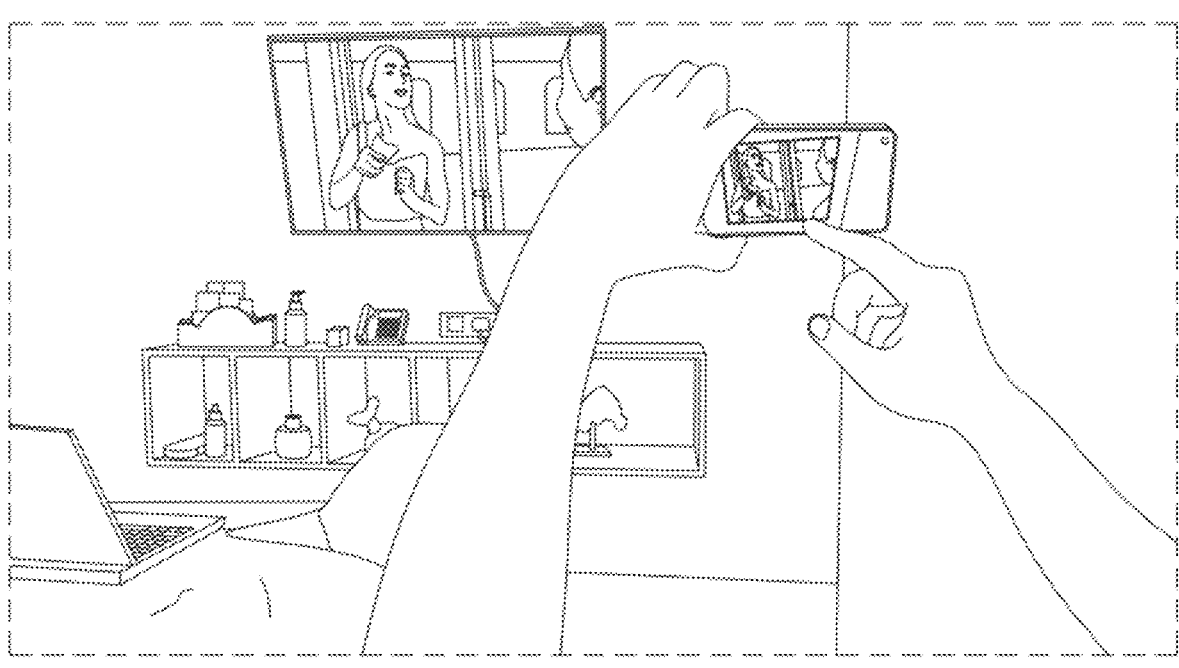

FIG. 3 illustrates an exemplary schematic representation 300 of the one or more users associated with the one or more user devices 106 capturing a video of the one or more media content being displayed on one or more display devices 116 including a television, in accordance with an embodiment of the present disclosure. The one or more user devices 106 are configured to capture the one or more video content played on the one or more display devices 116. The encoded media content is displayed on the screen of the one or more display devices 116 with refresh rate of 60 Hz. In an exemplary embodiment, the media content is captured around 20 seconds duration, at 120 frame rate. The one or more user devices 106 may record a 5 second clip and send the content to a server for processing.

Figure 4:
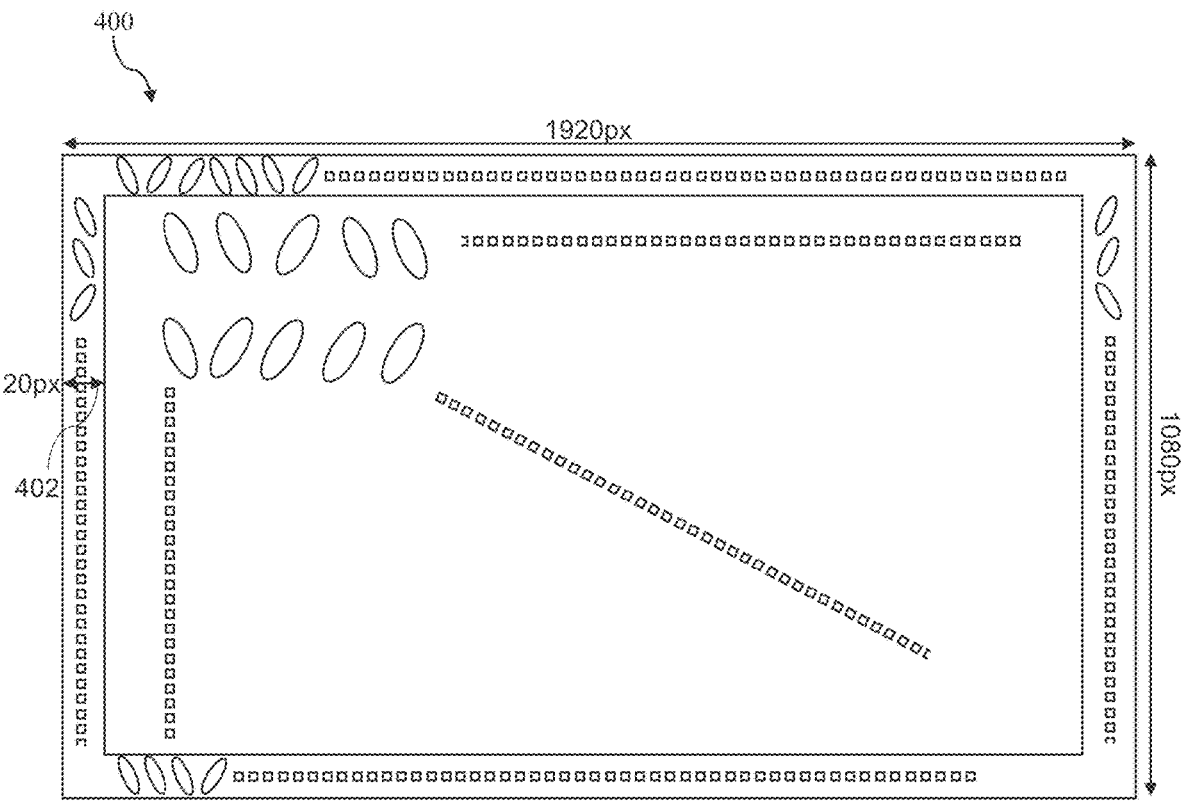
FIG. 4 is a schematic representation depicting one or more data frames for automatic content recognition (ACR) and metadata information transmission, in accordance with an embodiment of the present disclosure.

FIG. 4 is a schematic representation 400 depicting one or more data frames for automatic content recognition (ACR) and information (i.e., metadata information) transmission, in accordance with an embodiment of the present disclosure. The schematic representation 400 depicts that the width border 402 is set to the pre-determined pixel values (e.g., 20 pixels) at the one or more boundaries along four sides of the one or more frames for encoding the one or more data associated with automatic content recognition and transmitting the one or more metadata information. The metadata information for the purpose of screen-to-camera communication may be embedded in the interior of the one or more frames. In an embodiment, the one or more symbols encoded at the one or more boundaries may be same or different than the symbols encoded in the interior of the one or more frames. In an embodiment, the modulation depth of the one or more pixels in the one or more boundaries is smaller than the modulation depth in the interior of the one or more frames.

Figure 5:
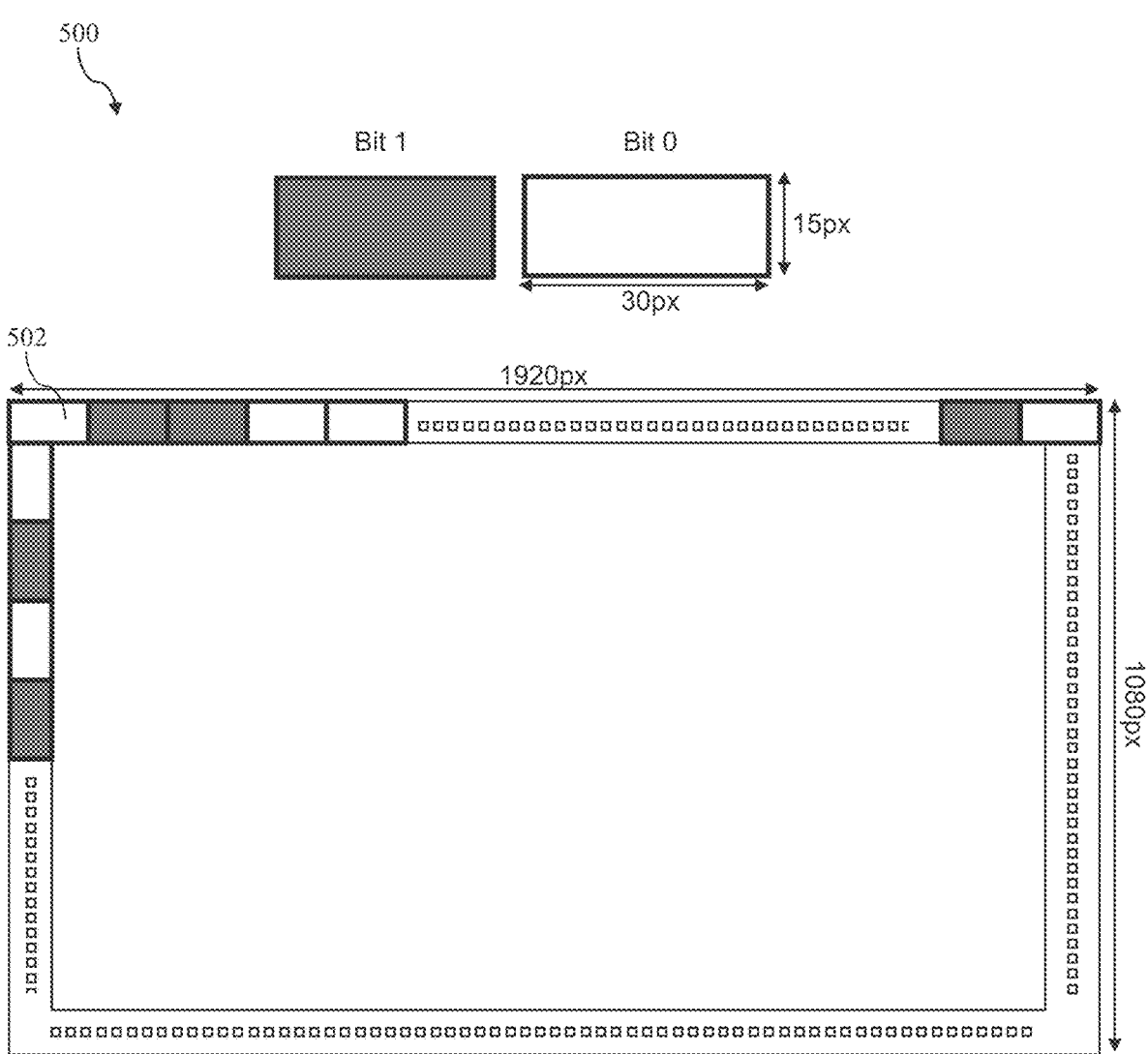
FIG. 5 is a schematic representation depicting encoding of the metadata information in one or more boundaries, in accordance with an embodiment of the present disclosure.

FIG. 5 is a schematic representation 500 depicting encoding of the metadata information at one or more boundaries, in accordance with an embodiment of the present disclosure. The schematic representation 500 depicts that the metadata information is only encoded at the one or more boundaries. Further, the metadata information within the interior of the one or more frames is kept intact. The schematic representation 500 further depicts that the one or more boundaries are assembled/tiled with the one or more boxes 502. In an embodiment, each box of the one or more boxes 502 are uniformly assembled in the one or more boundaries (e.g., the one or more boxes 502 include the one or more first pre-determined sizes (e.g., 15*30 pixels)).

In another embodiment, each box of the one or more boxes 502 are differently assembled in the one or more boundaries (e.g., the one or more boxes include the one or more first pre-determined sizes (e.g., 15*30 pixels) that may represent the bit value of 1 and the one or more first pre-determined sizes (e.g., 15*15 pixels) that may represent the bit value of 0). Upon using the energy accumulation decoding, the one or more boxes 502 indicating the bit value of 1 with temporal chromatic flickering, may light up and the one or more boxes 502 indicating the bit value of 0 may not light up. In an embodiment, with this encoding of the bit value of 0 and the bit value of 1, the screen detection and the data transmission may be performed.

Figure 6:
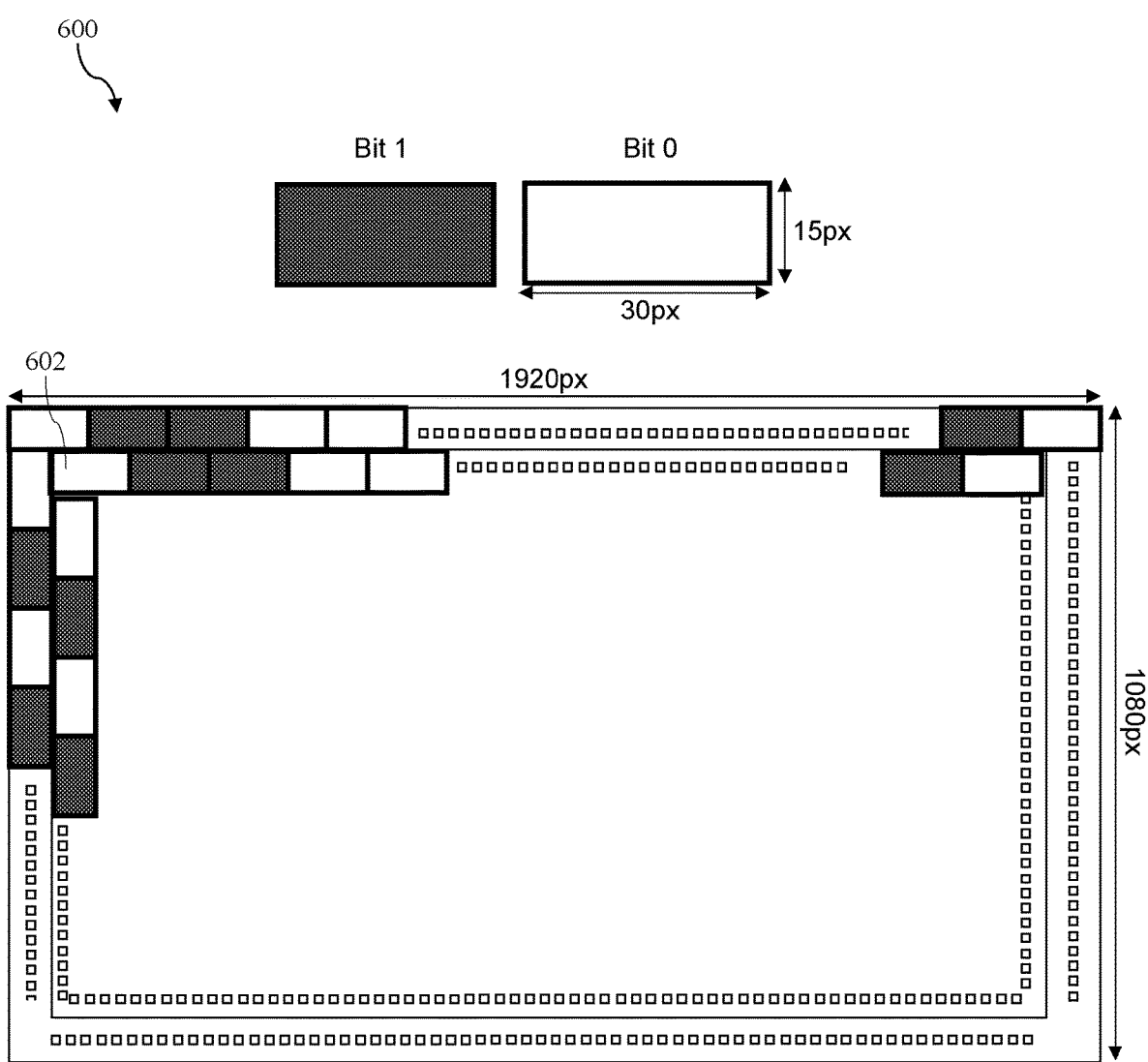
FIG. 6 is a schematic representation depicting an optimization of redundancy by having another layer of information in the one or more boundaries to encode the metadata information, in accordance with an embodiment of the present disclosure.

FIG. 6 is a schematic representation 600 depicting an optimization of redundancy by having another layer 602 of information in the one or more boundaries to encode the metadata information, in accordance with an embodiment of the present disclosure. The schematic representation 600 depicts that by having another layer 602 along the one or more boundaries including the one or boxes with the one or more first pre-determined sizes (e.g., 15*15 pixels). The layer may provide 30 pixels flickering boundary which causes doubling the redundancy. The optimization of the redundancy may reduce the modulation depth and flickering intensity. The optimization of the redundancy may further be used for reliable decoding processes.

Figure 7:
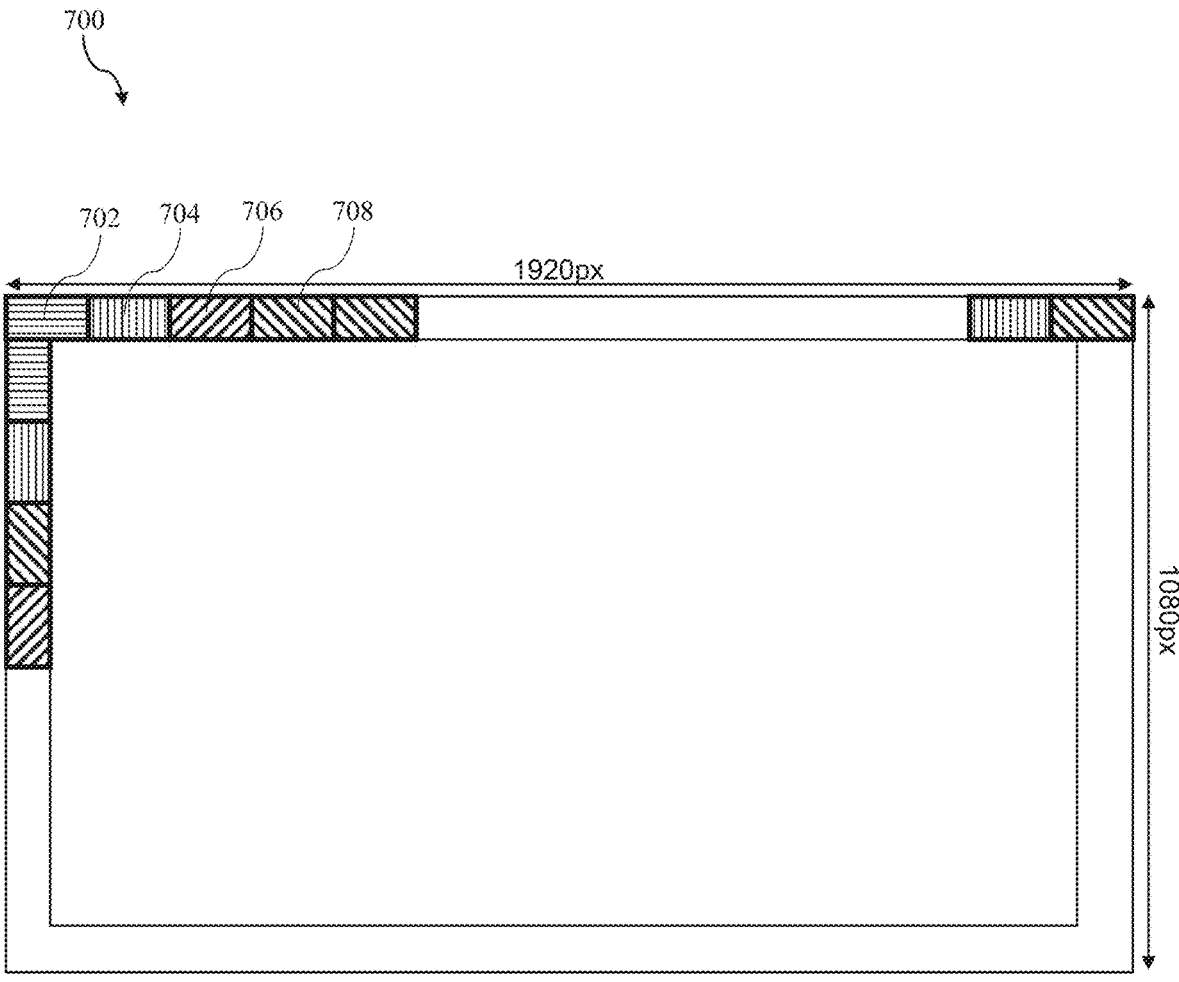
FIG. 7 is a schematic representation depicting an optimization of redundancy by having one or more patterns indicating two or more bits within one or more boxes, in accordance with an embodiment of the present disclosure.

FIG. 7 is a schematic representation 700 depicting an optimization of redundancy by having one or more patterns indicating two or more bits within the one or more boxes, in accordance with an embodiment of the present disclosure. The schematic representation 700 depicts that the redundancy is optimized by having one or more patterns within the one or more boxes. The one or more patterns may represent/indicate different bits being encoded in the one or more boxes. For example, as show in FIG. 7, a pattern with horizontal stripes 702 may represent the bits 00. A pattern with vertical stripes 704 may represent the bits 01. A pattern with 45-degree stripes 706 may represent the bits 10. A pattern with 135-degree stripes 708 may represent the bits 11. In an embodiment, the machine learning model (e.g., the neural network model) is trained to detect the one or more patterns within the one or more boxes. The redundancy may be optimized by encoding two or more bits per symbol by training the neural network model to detect subtle patterns within the one or more boxes.

Figure 8:
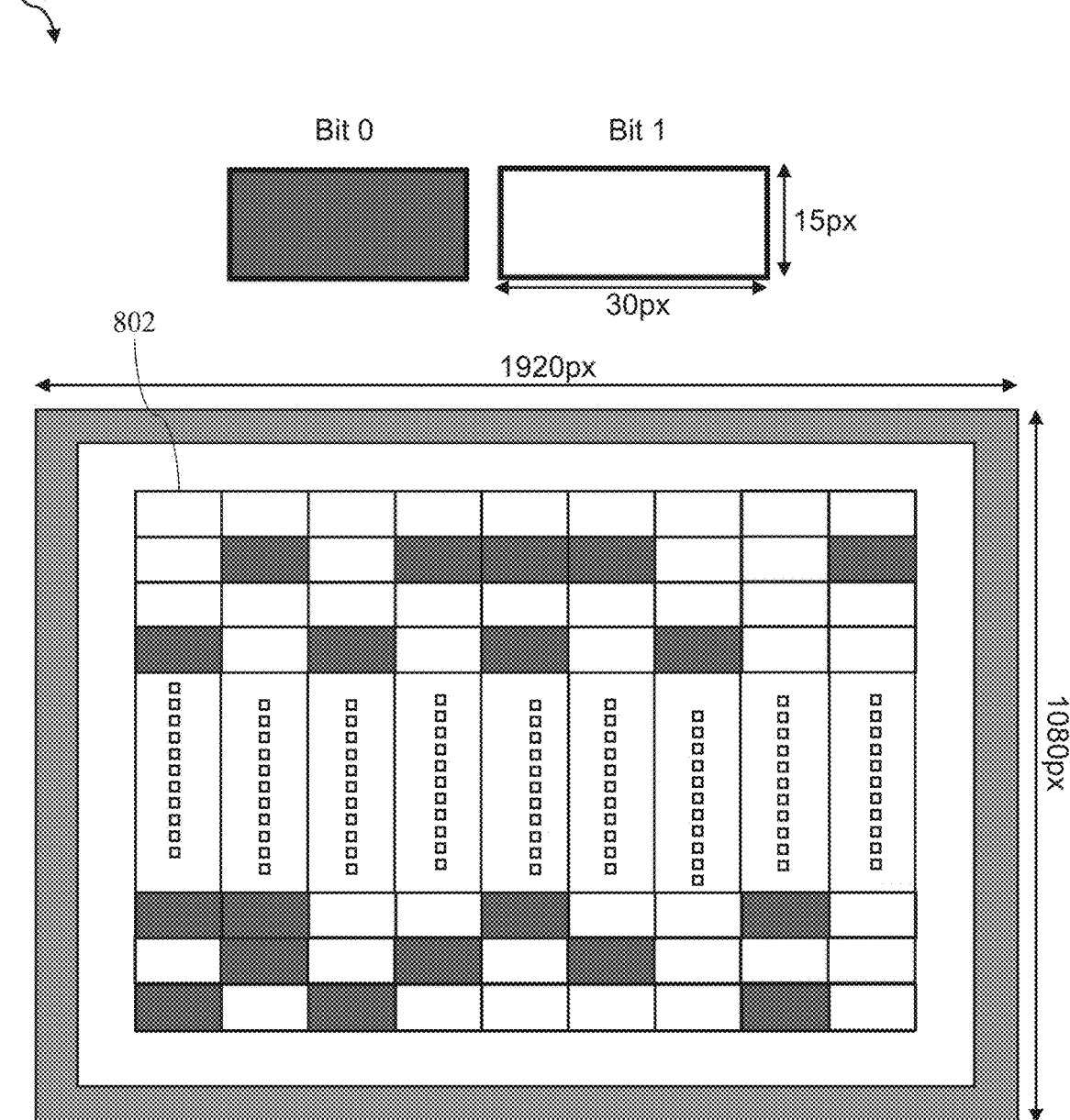
FIG. 8 is a schematic representation depicting an optimization of redundancy by assembling the one or more boxes within an interior of one or more frames, in accordance with an embodiment of the present disclosure.

FIG. 8 is a schematic representation 800 depicting the optimization of the redundancy by assembling the one or more boxes 802 within the interior of one or more frames, in accordance with an embodiment of the present disclosure. The schematic representation 800 depicts that the one or more boxes 802 are tiled/assembled within the interior of the one or more frames. The bit value of 0 may be indicated/ represented by a box of the pixels which are not flickered and the bit value of 1 may be indicated by a box of the pixels which are flickered, or vice-versa.

Figure 9:
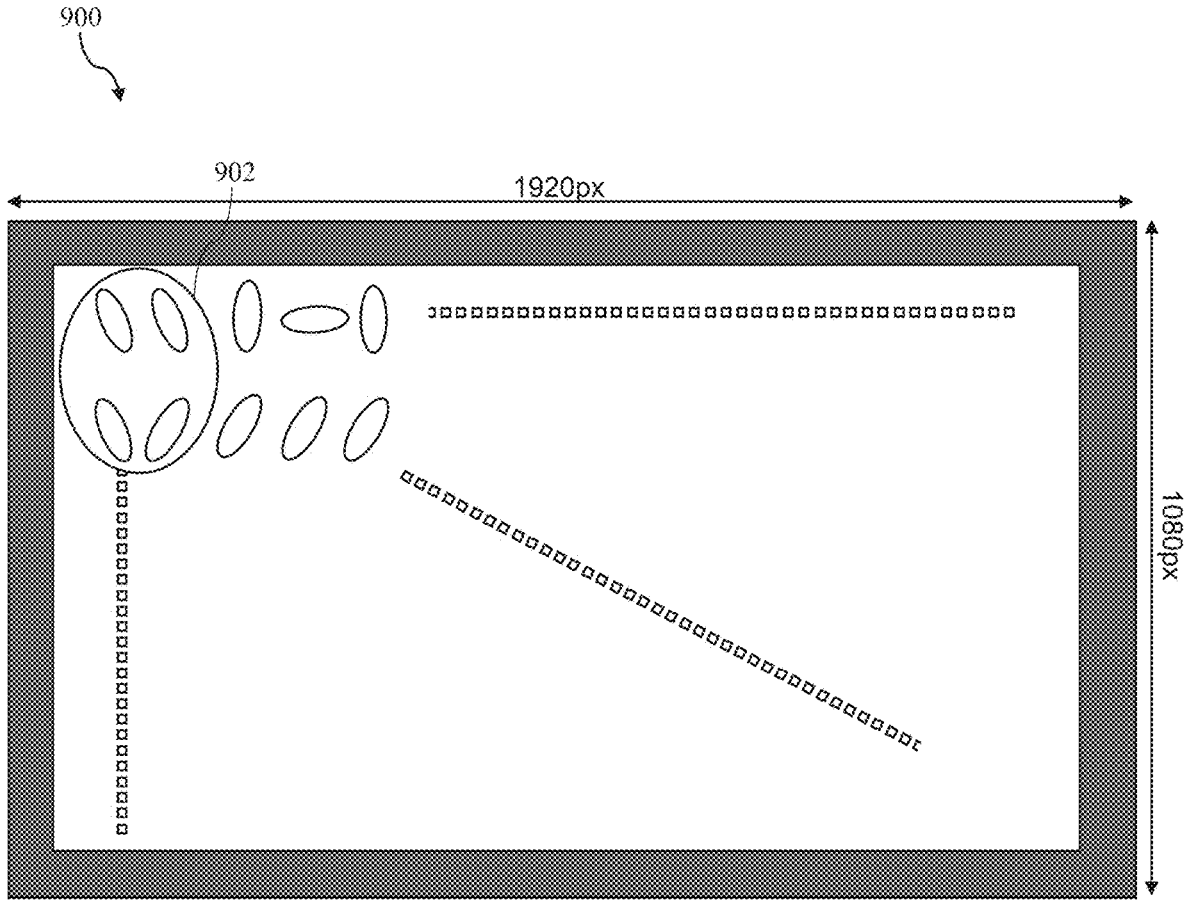
FIG. 9 is a schematic representation depicting an optimization of error correction capability of a Reed-Solomon code by grouping one or more symbols/shapes more tightly to determine less erasure or errors, in accordance with an embodiment of the present disclosure.

FIG. 9 is a schematic representation 900 depicting an optimization of error correction capability of a Reed-Solomon code by grouping one or more symbols/shapes 902 more tightly to determine less erasure or errors, in accordance with an embodiment of the present disclosure. The schematic representation 900 depicts that at least two bits with the pre-defined number of symbols (e.g., 4 symbols/ shapes) 902 in the one or more regions to obtain Reed-Solomon codes for error-correction of the one or more bits of the one or more information. Hence, totally 8 bits and 4 symbols may form one RS alphabet. In an embodiment, an erasure of one symbol in the RS alphabet may result in erasure of entire associated RS alphabet.

Figure 10:
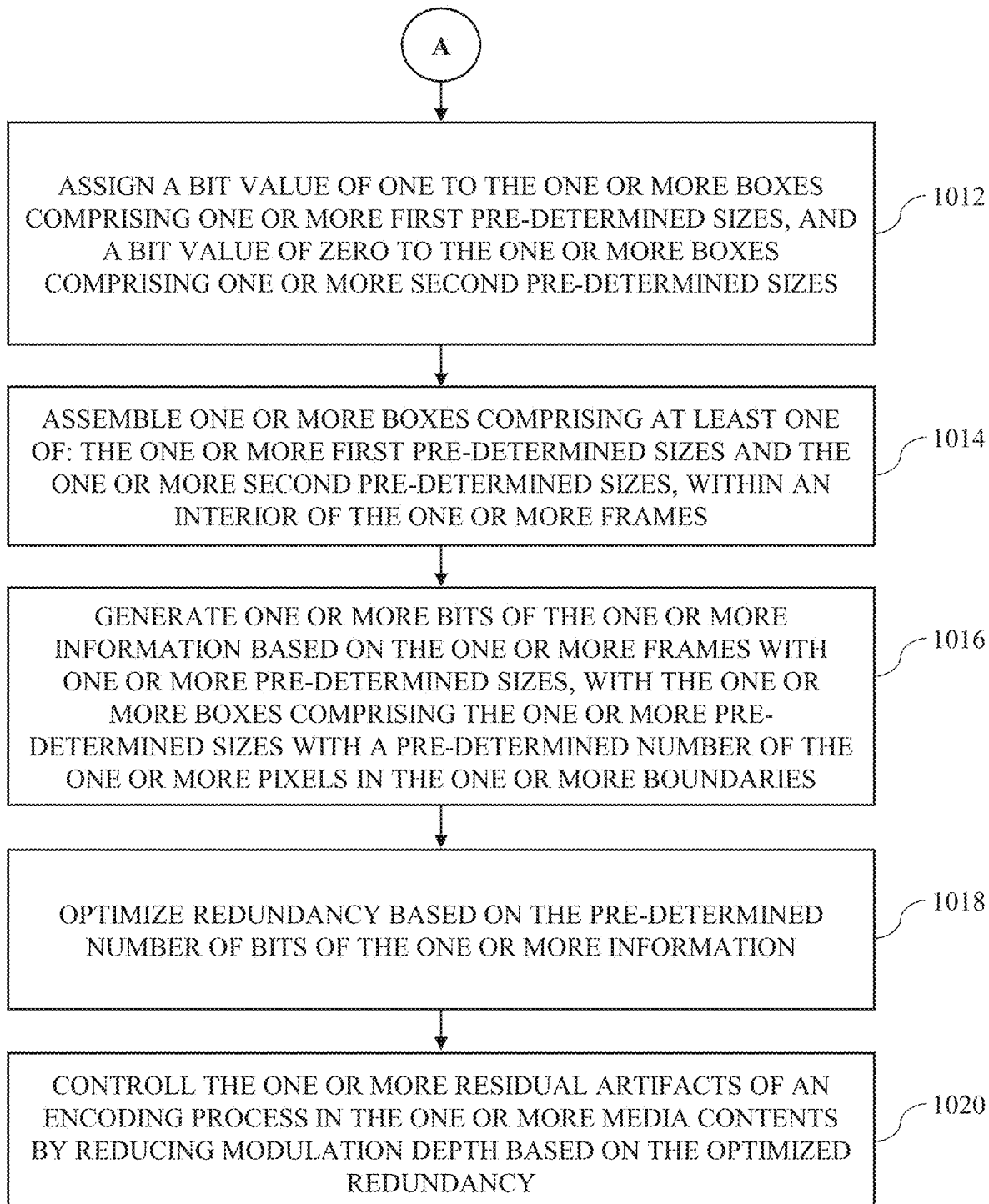
FIG. 10 is a flow chart illustrating a machine learning based (ML-based) method for controlling the one or more residual artifacts in the one or more media contents to optimize the user experience in the real-time screen-to-camera communication environment, in accordance with an embodiment of the present disclosure.

FIG. 10 is a flow chart illustrating a machine learning based (ML-based) method 1000 for controlling the one or more residual artifacts in the one or more media contents to optimize the user experience in the real-time screen-to-camera communication environment, in accordance with an embodiment of the present disclosure.

At step 1002, the one or more RGB values of one or more pixels associated with one or more frames of the one or more media contents, are converted to one or more values of one or more orthogonal color space values or the perceptual color space values for the one or more pixels associated with the one or more frames of the one or more media contents.

At step 1004, the one or more intensities of the one or more frames associated with the one or more media contents, are segmented into at least one of: the bright region, the dark region, and the middle region. In an embodiment, each region of at least one of: the bright region, the dark region, and the middle region, is divided into one or more sub-regions to provide control on modifications to the one or more pixel values.

At step 1006, the one or more symbols comprising one or more optimized-frequency regions being detectable and classifiable are generated using the machine learning model.

At step 1008, the width border is set to pre-determined pixel values at the one or more boundaries along four sides of the one or more frames for encoding the one or more data associated with the automatic content recognition.

At step 1010, the one or more boundaries are divided into the one or more boxes comprising one or more pre-determined sizes, to embed the one or more information associated with the one or more symbols.

At step 1012, the bit value of one to the one or more boxes comprising one or more first pre-determined sizes, and a bit value of zero to the one or more boxes comprising one or more second pre-determined sizes, are assigned. In an embodiment, the one or more pixels in the one or more boxes comprising the one or more first pre-determined sizes are flickered.

At step 1014, the one or more boxes comprising at least one of: the one or more first pre-determined sizes and the one or more second pre-determined sizes, are assembled within the interior of the one or more frames.

At step 1016, one or more bits of the one or more information are generated based on the one or more frames with the one or more pre-determined sizes, with the one or more boxes comprising the one or more pre-determined sizes with the pre-determined number of the one or more pixels in the one or more boundaries.

At step 1018, the redundancy is optimized based on the pre-determined number of bits of the one or more information.

At step 1020, the one or more residual artifacts of an encoding process in the one or more media contents are controlled by reducing modulation depth based on the optimized redundancy.

The present invention has following advantages. The present invention with the machine learning based system 102 is configured to control/reduce the one or more residual artifacts in the one or more media contents to optimize the user experience in the real-time screen-to-camera communication environment. The present invention is configured to rapidly flicker the intensity or color of pixels on the screen across the one or more frames, to transmit the information so that the information is leverage out by a human visual system and thus invisible.

The present invention may provide more security to the one or more media content. The present invention may help to secure the content from a malicious user. The present invention is configured to obtain the difference between alternate frames and to accumulate pixel energy over N frames.

The present invention is configured to modulate the intensities on the orthogonal colorspace values or the perceptual color space values. The present invention is configured to encode the shapes. The present invention is configured to utilize the neural network model to detect the one or more bits and the one or more regions. The present invention is configured to protect the bits of information from the attacker. Even though, the attacker decodes all the bits, the bits are useless until the bits are logically checked with the server.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine learning based method for controlling one or more residual artifacts in one or more media contents to optimize user experience in real-time screen-to-camera communication environment, the machine learning based method comprising:

converting, by one or more hardware processors, one or more Red Green Blue (RGB) values of one or more pixels associated with one or more frames of the one or more media contents to one or more values of one or more orthogonal color space values for the one or more pixels associated with the one or more frames of the one or more media contents;

segmenting, by the one or more hardware processors, one or more intensities of the one or more frames associated with the one or more media contents, into at least one of: bright region, dark region, and middle region, wherein each region of at least one of: the bright region, the dark region, and the middle region, is divided into one or more sub-regions to provide control on modifications to one or more pixel values;

generating, by the one or more hardware processors, one or more symbols comprising one or more optimized-frequency regions being detectable and classifiable using a machine learning model;

setting, by the one or more hardware processors, a width border of one or more boundaries to pre-determined pixel values along four sides of the one or more frames for encoding one or more data associated with automatic content recognition;

dividing, by the one or more hardware processors, the one or more boundaries into one or more boxes comprising one or more pre-determined sizes, to embed one or more information associated with the one or more symbols;

assigning, by the one or more hardware processors, a bit value of one to the one or more boxes comprising one or more first pre-determined sizes, and a bit value of zero to the one or more boxes comprising one or more second pre-determined sizes, wherein the one or more pixels in the one or more boxes comprising the one or more first pre-determined sizes are flickered;

assembling, by the one or more hardware processors, one or more boxes comprising at least one of: the one or more first pre-determined sizes and the one or more second pre-determined sizes, within an interior of the one or more frames;

generating, by the one or more hardware processors, one or more bits of the one or more information based on the one or more frames with one or more pre-determined sizes, with the one or more boxes comprising the one or more pre-determined sizes with a pre-determined number of the one or more pixels in the one or more boundaries;

optimizing, by the one or more hardware processors, redundancy based on a pre-determined number of bits of the one or more information; and controlling, by the one or more hardware processors, the one or more residual artifacts of an encoding process in the one or more media contents by reducing modulation depth based on the optimized redundancy.

2. The machine learning based method of claim 1, further comprising:

segmenting, by the one or more hardware processors, the one or more frames associated with the one or more media contents into the one or more boxes;

encoding, by the one or more hardware processors, each box of the one or more boxes in one or more second boxes with at least one of: the bit value of one indicating flickering of the one or more pixels and the bit value of zero indicating non-flickering of the one or more pixels;

generating, by the one or more hardware processors, one or more matrices of at least one of: the bit value of one and the bit value of zero, wherein a size of the one or more matrices is a size of the one or more boxes; and encoding, by the one or more hardware processors, the one or more information of the one or more bits in the one or more boxes based on two-dimensional sequences with auto-correlation properties.

3. The machine learning based method of claim 1, further comprising adjusting, by the one or more hardware processors, the one or more Red Green Blue (RGB) color values based on one or more values corresponding to each Red Green Blue color.

4. The machine learning based method of claim 1, further comprising encoding, by the one or more hardware processors, the one or more information in one or more spaces between one or more data symbols by placing the one or more data symbols at two or more relative positions.

5. The machine learning based method of claim 1, further comprising:

grouping, by the one or more hardware processors, at least two bits with a pre-defined number of symbols in one or more regions to obtain Reed-Solomon codes for error-correction of the one or more bits of the one or more information; and detecting, by the one or more hardware processors, the one or more regions based on an image segmentation technique at a decoder using the machine learning model, wherein the machine learning model comprises a neural network model.

6. The machine learning based method of claim 5, further comprising training, by the one or more hardware processors, the machine learning model for detecting at least one of: one or more screens associated with one or more display devices and the one or more regions in which the at least two bits with a pre-defined number of symbols are grouped, and decoding the one or more bits, wherein training the machine learning model comprises:

obtaining, by the one or more hardware processors, one or more information associated with one or more symbols through which at least two bits are transmitted;

determining, by the one or more hardware processors, whether the one or more symbols are corresponding to the pre-defined number of symbols;

generating, by the one or more hardware processors, one or more confidence scores upon the determination of the one or more symbols being correspondent to the pre-defined number of symbols; and determining, by the one or more hardware processors, one or more errors on the one or more bits of the one or more information when the generated one or more confidence scores are within a pre-determined threshold value.

7. The machine learning based method of claim 1, further comprising encrypting, by the one or more hardware processors, one or more sequences of the one or more bits of the one or more information using one or more cryptographic private keys.

8. The machine learning based method of claim 1, further comprising up-sampling, by the one or more hardware processors, the one or more media content to modify the one or more media content during transmission of the one or more information, wherein the modified one or more media content are invisible to one or more users, and wherein up-sampling of the one or more media content comprises:

converting, by the one or more hardware processors, one or more frame rates to a pre-defined frame rate using a sample-and-hold technique;

generating, by the one or more hardware processors, a first list of frames upon performing sample-and-hold up-sampling process for the one or more media content at the pre-defined frame rate;

generating, by the one or more hardware processors, a second list of frames by:

setting, by the one or more hardware processors, an index (j) in the first list of frames, which is excluding of at least one of: first position and last position, wherein if the index in the first list of frames is hold the first position, the first list of frames is placed at the first position, and wherein if the index in the first list of frames is hold the last position, the first list of frames is placed at the last position;

modifying, by the one or more hardware processors, at least one of: the second list of frames and a third list of frames by:

computing, by the one or more hardware processors, a linear combination of at least two elements of each frame in at least one of: the second list of frames and the third list of frames to determine an average value for the linear combination of at least two elements;

maintaining, by the one or more hardware processors, at least two elements of each frame in at least one of: the second list of frames and the third list of frames, unchanged if the average value for a corresponding computed linear combination of at least two elements is a non-integer value;

incrementing, by the one or more hardware processors, the average value of at least two elements by adding with a variable counter value if the average value for the corresponding computed linear combination of at least two elements is an integer value, wherein the variable counter value is set to one;

dropping, by the one or more hardware processors, at least two elements of each frame in at least one of: the second list of frames and the third list of frames, if a value of addition of the average value with the variable counter value is odd; and duplicating, by the one or more hardware processors, at least two elements of each frame in at least one of: the second list of frames and the third list of frames, if a value of addition of the average value with the variable counter value is even; and regenerating, by the one or more hardware processors, the one or more frames of the one or more media content to be rendered at the pre-defined frame rate by computing the linear combination of at least two contents in the second list of frames, to attain the modified one or more media content being invisible to the one or more users and to control flickering.

9. A machine learning based system for controlling one or more residual artifacts in the one or more media contents to optimize user experience in real-time screen-to-camera communication environment, the machine learning based system comprising:

one or more hardware processors; and a memory coupled to the one or more hardware processors, wherein the memory comprises a plurality of subsystems in form of programmable instructions executable by the one or more hardware processors, wherein the plurality of subsystems comprises:

a color space values conversion subsystem configured to convert one or more Red Green Blue (RGB) values of one or more pixels associated with one or more frames of the one or more media contents to one or more values of one or more orthogonal color space values for the one or more pixels associated with the one or more frames of the one or more media contents;

an intensity segmenting subsystem configured to segment one or more intensities of the one or more frames associated with the one or more media contents, into at least one of: bright region, dark region, and middle region, wherein each region of at least one of: the bright region, the dark region, and the middle region, is divided into one or more sub-regions to provide control on modifications to one or more pixel values;

a symbol generation subsystem configured to generate one or more symbols comprising one or more optimized-frequency regions being detectable and classifiable using a machine learning model;

a border setting subsystem configured to set a width border of one or more boundaries to pre-determined pixel values along four sides of the one or more frames for encoding one or more data associated with automatic content recognition;

a boundaries dividing subsystem configured to divide the one or more boundaries into one or more boxes comprising one or more pre-determined sizes, to embed one or more information associated with the one or more symbols;

a value assigning subsystem configured to assign a bit value of one to the one or more boxes comprising one or more first pre-determined sizes, and a bit value of zero to the one or more boxes comprising one or more second pre-determined sizes, wherein the one or more pixels in the one or more boxes comprising the one or more first pre-determined sizes are flickered;

a box assembling subsystem configured to assemble one or more boxes comprising at least one of: the one or more first pre-determined sizes and the one or more second pre-determined sizes, within an interior of the one or more frames;

a bit generation subsystem configured to generate one or more bits of the one or more information based on the one or more frames with one or more pre-determined sizes, with the one or more boxes comprising the one or more pre-determined sizes with a pre-determined number of the one or more pixels in the one or more boundaries;

a redundancy optimizing subsystem configured to optimize redundancy based on a pre-determined number of bits of the one or more information; and a residual artifact controlling subsystem configured to control the one or more residual artifacts of an encoding process in the one or more media contents by reducing modulation depth based on the optimized redundancy.

10. The machine learning based system of claim 9, further comprising an information encoding subsystem configured to:

segment the one or more frames associated with the one or more media contents into the one or more boxes;

encode each box of the one or more boxes in one or more second boxes with at least one of: the bit value of one indicating flickering of the one or more pixels and the bit value of zero indicating non-flickering of the one or more pixels;

generate one or more matrices of at least one of: the bit value of one and the bit value of zero, wherein a size of the one or more matrices is a size of the one or more boxes; and encode the one or more information of the one or more bits in the one or more boxes based on two-dimensional sequences with auto-correlation properties.

11. The machine learning based system of claim 9, wherein the color space values conversion subsystem is further configured to adjust the one or more Red Green Blue (RGB) color values based on one or more values corresponding to each Red Green Blue color.

12. The machine learning based system of claim 9, wherein the information encoding subsystem is further configured to encode the one or more information in one or more spaces between one or more data symbols by placing the one or more data symbols at two or more relative positions.

13. The machine learning based system of claim 9, further comprising a grouping subsystem configured to:

group at least two bits with a pre-defined number of symbols in one or more regions to obtain Reed-Solomon codes for error-correction of the one or more bits of the one or more information; and detect the one or more regions based on an image segmentation technique at a decoder using the machine learning model, wherein the machine learning model comprises a neural network model.

14. The machine learning based system of claim 13, further comprising a training subsystem configured to train the machine learning model for detecting at least one of: one or more screens associated with one or more display devices and the one or more regions in which the at least two bits with a pre-defined number of symbols are grouped, and decoding the one or more bits, wherein in training the machine learning model, the training subsystem is configured to:

obtain one or more information associated with one or more symbols through which at least two bits are transmitted;

determine whether the one or more symbols are corresponding to the pre-defined number of symbols;

generate one or more confidence scores upon the determination of the one or more symbols being correspondent to the pre-defined number of symbols; and determine one or more errors on the one or more bits of the one or more information when the generated one or more confidence scores are within a pre-determined threshold value.

15. The machine learning based system of claim 9, wherein the information encoding subsystem is further configured to encrypt one or more sequences of the one or more bits of the one or more information using one or more cryptographic private keys.

16. The machine learning based system of claim 9, further comprising an up-sampling subsystem configured to up-sample the one or more media content to modify the one or more media content during transmission of the one or more information, wherein the modified one or more media content are invisible to one or more users, and wherein in up-sampling of the one or more media content, the up-sampling subsystem is configured to:

convert one or more frame rates to a pre-defined frame rate using a sample-and-hold technique;

generate a first list of frames upon performing sample-and-hold up-sampling process for the one or more media content at the pre-defined frame rate;

generate a second list of frames by:

setting an index (j) in the first list of frames, which is excluding of at least one of: first position and last position, wherein if the index in the first list of frames is hold the first position, the first list of frames is placed at the first position, and wherein if the index in the first list of frames is hold the last position, the first list of frames is placed at the last position;

modifying at least one of: the second list of frames and a third list of frames by:

computing a linear combination of at least two elements of each frame in at least one of: the second list of frames and the third list of frames to determine an average value for the linear combination of at least two elements;

maintaining at least two elements of each frame in at least one of: the second list of frames and the third list of frames, unchanged if the average value for a corresponding computed linear combination of at least two elements is a non-integer value;

incrementing the average value of at least two elements by adding with a variable counter value if the average value for the corresponding computed linear combination of at least two elements is an integer value, wherein the variable counter value is set to one;

dropping at least two elements of each frame in at least one of: the second list of frames and the third list of frames, if a value of addition of the average value with the variable counter value is odd; and duplicating at least two elements of each frame in at least one of: the second list of frames and the third list of frames, if a value of addition of the average value with the variable counter value is even; and regenerate the one or more frames of the one or more media content to be rendered at the pre-defined frame rate by computing the linear combination of at least two contents in the second list of frames, to attain the modified one or more media content being invisible to the one or more users and to control flickering.

17. A non-transitory computer-readable storage medium having instructions stored therein that when executed by one or more hardware processors, cause the one or more hardware processors to execute operations of:

converting one or more Red Green Blue (RGB) values of one or more pixels associated with one or more frames of the one or more media contents to one or more values of one or more orthogonal color space values for the one or more pixels associated with the one or more frames of the one or more media contents;

segmenting one or more intensities of the one or more frames associated with the one or more media contents, into at least one of: bright region, dark region, and middle region, wherein each region of at least one of: the bright region, the dark region, and the middle region, is divided into one or more sub-regions to provide control on modifications to one or more pixel values;

generating one or more symbols comprising one or more optimized-frequency regions being detectable and classifiable using a machine learning model;

setting a width border of one or more boundaries to pre-determined pixel values along four sides of the one or more frames for encoding one or more data associated with automatic content recognition;

dividing the one or more boundaries into one or more boxes comprising one or more pre-determined sizes, to embed one or more information associated with the one or more symbols;

assigning a bit value of one to the one or more boxes comprising one or more first pre-determined sizes, and a bit value of zero to the one or more boxes comprising one or more second pre-determined sizes, wherein the one or more pixels in the one or more boxes comprising the one or more first pre-determined sizes are flickered;

assembling one or more boxes comprising at least one of: the one or more first pre-determined sizes and the one or more second pre-determined sizes, within an interior of the one or more frames;

generating one or more bits of the one or more information based on the one or more frames with one or more pre-determined sizes, with the one or more boxes comprising the one or more pre-determined sizes with a pre-determined number of the one or more pixels in the one or more boundaries;

optimizing redundancy based on a pre-determined number of bits of the one or more information; and controlling the one or more residual artifacts of an encoding process in the one or more media contents by reducing modulation depth based on the optimized redundancy.

18. The non-transitory computer-readable storage medium of claim 17, further comprising:

grouping at least two bits with a pre-defined number of symbols in one or more regions to obtain Reed-Solomon codes for error-correction of the one or more bits of the one or more information; and detecting the one or more regions based on an image segmentation technique at a decoder using the machine learning model, wherein the machine learning model comprises a neural network model.

19. The non-transitory computer-readable storage medium of claim 18, further comprising training the machine learning model for detecting at least one of: one or more screens associated with one or more display devices and the one or more regions in which the at least two bits with a pre-defined number of symbols are grouped, and decoding the one or more bits, wherein training the machine learning model comprises:

obtaining one or more information associated with one or more symbols through which at least two bits are transmitted;

determining whether the one or more symbols are corresponding to the pre-defined number of symbols;

generating one or more confidence scores upon the determination of the one or more symbols being correspondent to the pre-defined number of symbols; and determining one or more errors on the one or more bits of the one or more information when the generated one or more confidence scores are within a pre-determined threshold value.

20. The non-transitory computer-readable storage medium of claim 17, further comprising up-sampling the one or more media content to modify the one or more media content during transmission of the one or more information, wherein the modified one or more media content are invisible to one or more users, and wherein up-sampling of the one or more media content comprises:

converting one or more frame rates to a pre-defined frame rate using a sample-and-hold technique;

generating a first list of frames upon performing sample-and-hold up-sampling process for the one or more media content at the pre-defined frame rate;

generating a second list of frames by:

setting an index (j) in the first list of frames, which is excluding of at least one of: first position and last position, wherein if the index in the first list of frames is hold the first position, the first list of frames is placed at the first position, and wherein if the index in the first list of frames is hold the last position, the first list of frames is placed at the last position;

modifying at least one of: the second list of frames and a third list of frames by:

computing a linear combination of at least two elements of each frame in at least one of: the second list of frames and the third list of frames to determine an average value for the linear combination of at least two elements;

maintaining at least two elements of each frame in at least one of: the second list of frames and the third list of frames, unchanged if the average value for a corresponding computed linear combination of at least two elements is a non-integer value;

incrementing the average value of at least two elements by adding with a variable counter value if the average value for the corresponding computed linear combination of at least two elements is an integer value, wherein the variable counter value is set to one;

dropping at least two elements of each frame in at least one of: the second list of frames and the third list of frames, if a value of addition of the average value with the variable counter value is odd; and duplicating at least two elements of each frame in at least one of: the second list of frames and the third list of frames, if a value of addition of the average value with the variable counter value is even; and regenerating the one or more frames of the one or more media content to be rendered at the pre-defined frame rate by computing the linear combination of at least two contents in the second list of frames, to attain the modified one or more media content being invisible to the one or more users and to control flickering.

\* \* \* \* \*